US010623607B2

(12) United States Patent
Watanabe et al.

(10) Patent No.: US 10,623,607 B2
(45) Date of Patent: Apr. 14, 2020

(54) IMAGE PROCESSING APPARATUS, IMAGE FORMING APPARATUS, AND IMAGE PROCESSING METHOD

(71) Applicants: Naoto Watanabe, Kanagawa (JP); Takeshi Ogawa, Kanagawa (JP); Takashi Soma, Kanagawa (JP)

(72) Inventors: Naoto Watanabe, Kanagawa (JP); Takeshi Ogawa, Kanagawa (JP); Takashi Soma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 48 days.

(21) Appl. No.: 15/014,155

(22) Filed: Feb. 3, 2016

(65) Prior Publication Data
US 2016/0234403 A1 Aug. 11, 2016

(30) Foreign Application Priority Data

Feb. 9, 2015 (JP) ................................. 2015-023646
Dec. 16, 2015 (JP) ................................. 2015-245660

(51) Int. Cl.
G06F 15/00 (2006.01)
H04N 1/60 (2006.01)
H04N 1/40 (2006.01)

(52) U.S. Cl.
CPC ........ *H04N 1/6033* (2013.01); *H04N 1/40087* (2013.01); *H04N 1/6038* (2013.01); *H04N 1/6041* (2013.01); *H04N 2201/0094* (2013.01)

(58) Field of Classification Search
CPC .. H04N 1/6033; H04N 1/6038; H04N 1/6041; H04N 1/40087
(Continued)

(56) References Cited

U.S. PATENT DOCUMENTS

2009/0238591 A1 9/2009 Watanabe et al.
2010/0271673 A1* 10/2010 Ohkawa ............... H04N 1/6033
358/518
(Continued)

FOREIGN PATENT DOCUMENTS

JP H11-112809 4/1999
JP 2010-134160 6/2010
(Continued)

OTHER PUBLICATIONS

Japanese Office Action dated Aug. 20, 2019 in Patent Application No. 2015-245660.

*Primary Examiner* — Mark R Milia
(74) *Attorney, Agent, or Firm* — Oblon, McClelland, Maier & Neustadt, L.L.P.

(57) ABSTRACT

An image processing apparatus includes: a storage unit to store therein, for each of a plurality of colors, correction information in which a correction value for obtaining a target output value is associated with each of combinations of one of a plurality of density values of image data corresponding to the color and one of a plurality of positions in a main scanning direction of image data; and a corrector to correct, when a pixel in input image data indicating image data received from a host device includes two or more colors, for each of the two or more colors, a density value of the color using a value smaller than a correction value corresponding to a combination of the density value of the color and a position of the pixel in the main scanning direction.

19 Claims, 19 Drawing Sheets

(58) Field of Classification Search
USPC .......................................................... 358/518
See application file for complete search history.

(56) References Cited

U.S. PATENT DOCUMENTS

| | | |
|---|---|---|
| 2012/0099165 A1 | 4/2012 | Omori et al. |
| 2012/0155899 A1 | 6/2012 | Watanabe et al. |
| 2013/0335754 A1* | 12/2013 | Utsunomiya ...... H04N 1/00809 |
| | | 358/1.5 |
| 2015/0156373 A1 | 6/2015 | Fujita et al. |
| 2015/0350491 A1 | 12/2015 | Iwata et al. |
| 2016/0012322 A1 | 1/2016 | Iwata et al. |

FOREIGN PATENT DOCUMENTS

| | | |
|---|---|---|
| JP | 2010-256764 A | 11/2010 |
| JP | 4661376 | 1/2011 |
| JP | 2012-088522 | 5/2012 |

\* cited by examiner

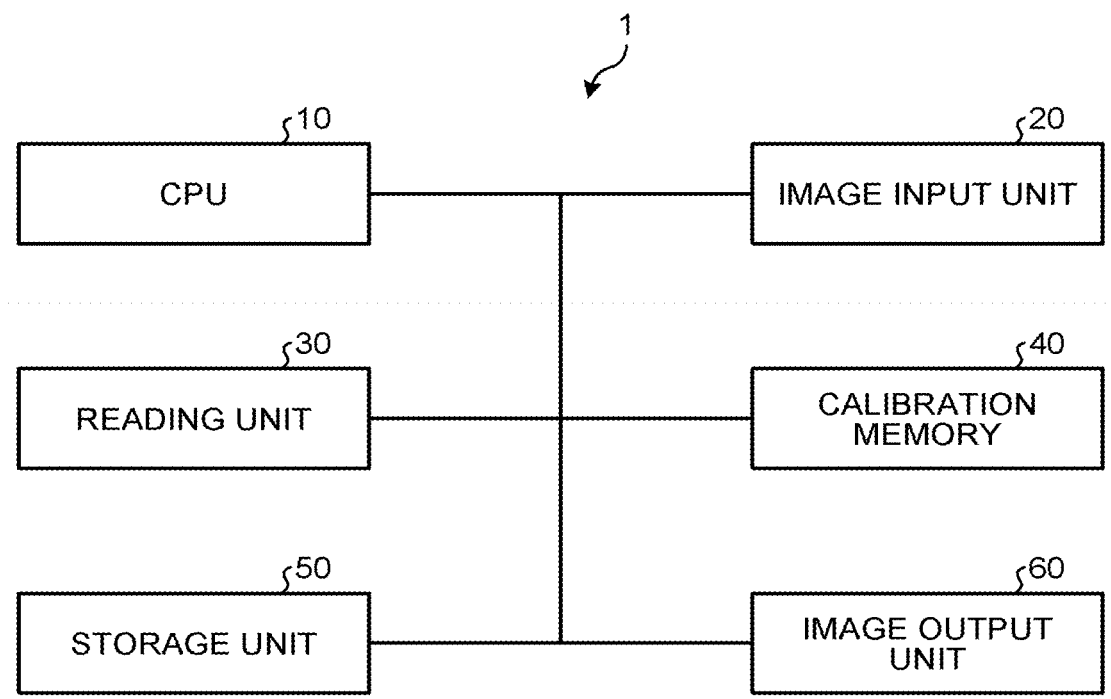
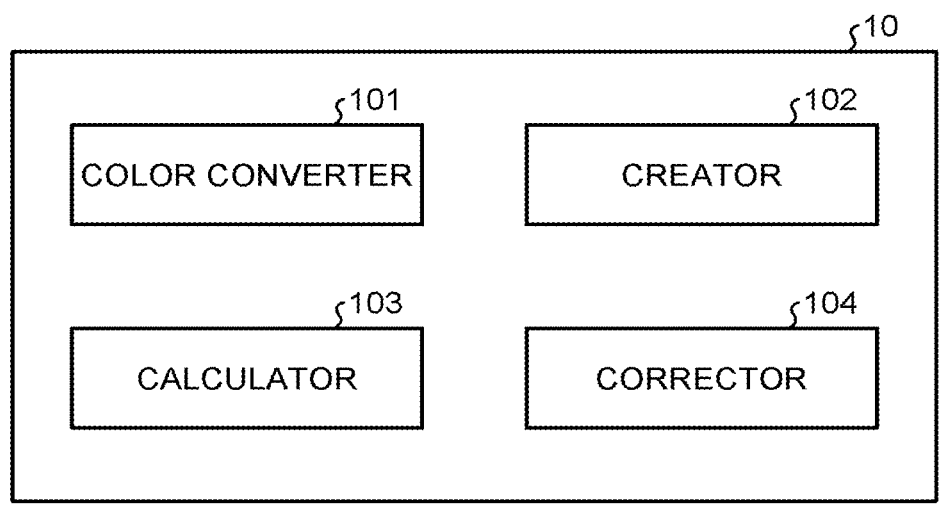

FIG.19

BEFORE
CALIBRATION

| IMAGE DENSITY | CYAN | MAGENTA | YELLOW | BLACK |
|---|---|---|---|---|
| 20% | 0.64 | 0.65 | 1.93 | 0.57 |
| 40% | 0.95 | 0.73 | 2.43 | 1.03 |

AFTER
CALIBRATION

| IMAGE DENSITY | CYAN | MAGENTA | YELLOW | BLACK |
|---|---|---|---|---|
| 20% | 0.42 | 0.38 | 0.33 | 0.57 |
| 40% | 0.67 | 0.8 | 0.69 | 0.42 |

IMAGE PROCESSING APPARATUS, IMAGE FORMING APPARATUS, AND IMAGE PROCESSING METHOD

CROSS-REFERENCE TO RELATED APPLICATIONS

The present application claims priority to and incorporates by reference the entire contents of Japanese Patent Application No. 2015-023646 filed in Japan on Feb. 9, 2015 and Japanese Patent Application No. 2015-245660 filed in Japan on Dec. 16, 2015.

BACKGROUND OF THE INVENTION

1. Field of the Invention

The present invention relates to an image processing apparatus, an image forming apparatus, and an image processing method.

2. Description of the Related Art

Techniques are conventionally known for correcting density values of input image data in order to eliminate image defects such as streaks (which hereinafter may be referred to as "vertical streaks") produced in the same direction as the feeding direction of a recording medium (for example, paper) in an image forming apparatus.

For example, Japanese Patent No. 4661376 discloses a technique for correcting density values of input image data by obtaining not only the tone characteristic (relation between the input tone value and the output tone value) of each primary color in printing an image of primary colors (basic constituent colors) but also the tone characteristic of each primary color in printing an image of multi-primary colors in which a plurality of basic constituent colors are superimposed on each other, and then creating a correction table based on the obtained characteristics.

However, the technique disclosed in Japanese Patent No. 4661376 requires an enormous amount of test patterns to be formed and an enormous amount of operations, because it is necessary to form an image of a test pattern for every combination of primary colors to obtain the tone characteristic of each primary color and then to create a correction table based on the obtained characteristics.

SUMMARY OF THE INVENTION

It is an object of the present invention to at least partially solve the problems in the conventional technology.

An image processing apparatus includes: a storage unit to store therein, for each of a plurality of colors, correction information in which a correction value for obtaining a target output value is associated with each of combinations of one of a plurality of density values of image data corresponding to the color and one of a plurality of positions in a main scanning direction of image data; and a corrector to correct, when a pixel in input image data indicating image data received from a host device includes two or more colors, for each of the two or more colors, a density value of the color using a value smaller than a correction value corresponding to a combination of the density value of the color and a position of the pixel in the main scanning direction.

An image forming apparatus includes: a storage unit to store therein, for each of a plurality of colors, correction information in which a correction value for obtaining a target output value is associated with each of combinations of one of a plurality of density values of image data corresponding to the color and one of a plurality of positions in a main scanning direction of image data; and a corrector to correct, when a pixel in input image data indicating image data received from a host device includes two or more colors, for each of the two or more colors, a density value of the color using a value smaller than a correction value corresponding to a combination of the density value of the color and a position of the pixel in the main scanning direction.

An image processing method includes, when a pixel in input image data indicating image data received from a host device includes two or more colors, referring to, for each of the two or more colors, correction information in which a correction value for obtaining a target output value is associated with each of combinations of one of a plurality of density values of image data corresponding to the color and one of a plurality of positions in a main scanning direction of image data, and correcting a density value of the color using a value smaller than a correction value corresponding to a combination of the density value of the color and a position of the pixel in the main scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an exemplary hardware configuration of an MFP;

FIG. 2 is a diagram illustrating exemplary functions of a CPU;

FIG. 19 is a diagram illustrating exemplary correction results obtained when calibration in a third embodiment is performed and when not performed;

DETAILED DESCRIPTION OF THE PREFERRED EMBODIMENTS

Figure 3:
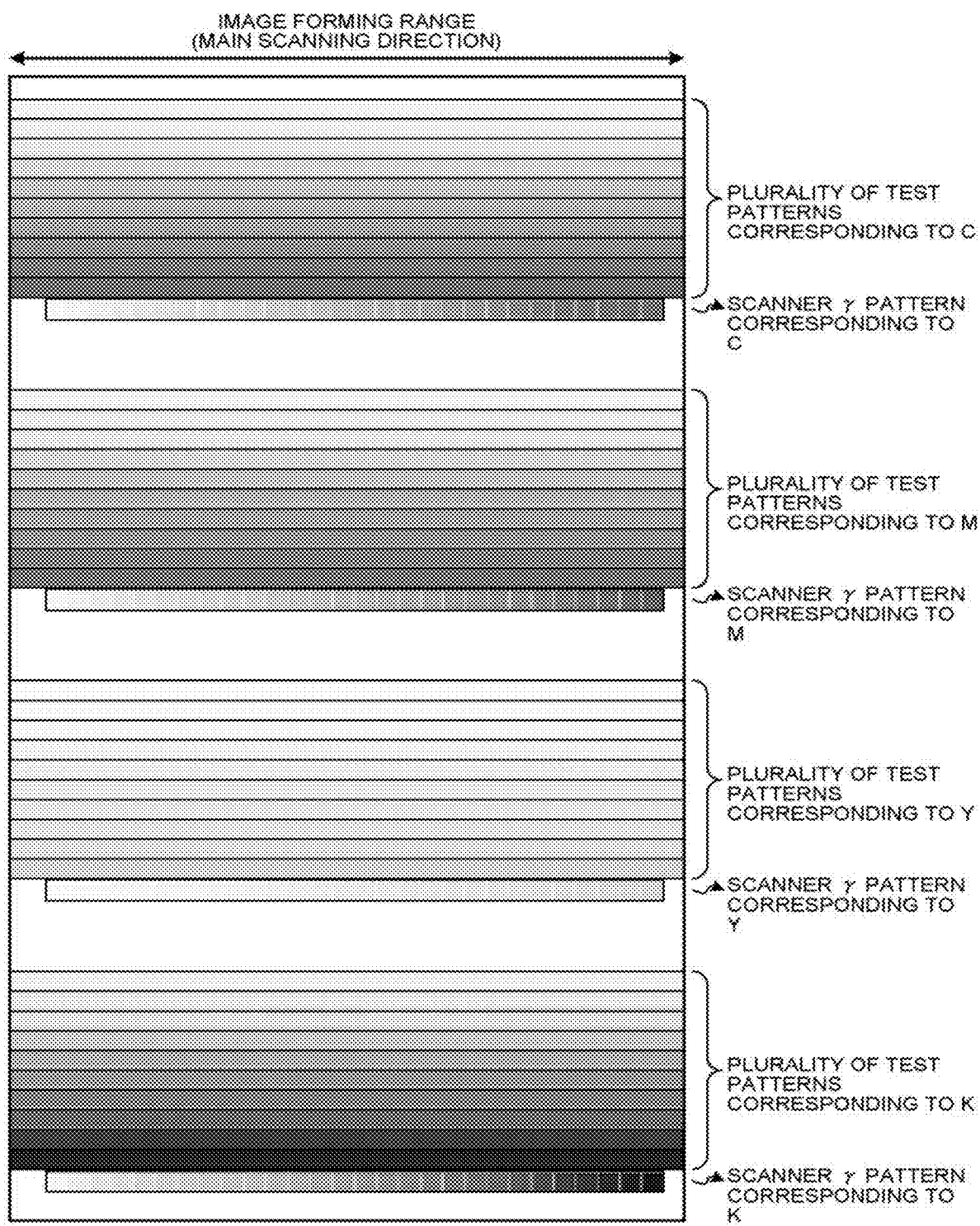
FIG. 3 is a diagram illustrating an exemplary calibration chart.

Embodiments of an image processing apparatus, an image forming apparatus, and an image processing method according to the present invention will be described in detail below with reference to the accompanying drawings. Although in the following description, a multifunction peripheral (MFP) will be described as an example of the image forming apparatus to which the present invention is applied, the image forming apparatus is not intended to be limited thereto. As used herein, the term "multifunction peripheral" refers to an apparatus having different functions including a copy function, a scanner function, a print function, and a facsimile function.

First Embodiment

An overview of the present embodiment will be described prior to a description of specific contents. Vertical streaks described above often originate in a device that charges a photoconductor using a corona discharge generator called a scorotron. Mild density deviations such as right-left density deviations often occur in the gap (which may be referred to as "process gap") between the photoconductor and the developing sleeve. Density deviations may also occur due to a deviation of the gap between the developing roller and the restricting member in the developing device for restricting developer. Various factors cause density changes ranging from thin steep density changes to wide mild density changes. A steep density change (density change in a length of 10 mm or less) looks streaked and is called a vertical streak. A density change in a length of approximately 10 mm to 100 mm looks like a band and is called a vertical band, and a mild density change beyond this length is recognized as unevenness and may be called density unevenness or density deviation.

In the present embodiment, all types of the density changes described above are addressed. Most of these density changes are produced mainly upstream from the photoconductor. The correction in the present embodiment does not cover contamination that always appears at the same position or gloss streaks produced in fixing, which are caused by poor cleaning. Performing the correction in the present embodiment on streaks (image defects) resulting from contamination or gloss changes may have adverse effects such as more streaks. Streaks resulting from contamination or gloss changes are preferably addressed by, for example, replacement of units or cleaning.

The problem of the technique disclosed in Japanese Patent No. 4661376 is as follows. Full-color machines represent colors by superimposing a plurality of colors (primary colors) on each other (two colors, three colors, four colors, etc.). It is then necessary to form an image of a test pattern for every combination of colors to obtain the tone characteristic for each color and then to create a correction table based on the obtained characteristics. Thus, the number of test patterns to be formed and the amount of operations are enormous.

In the present embodiment, the following two reasons have been found why problems arise if correction tables (correction information) for eliminating streaks produced in printing in a single color are merely superimposed on each other and applied to a change in streaks produced in printing with two or more colors superimposed.

Figure 22:
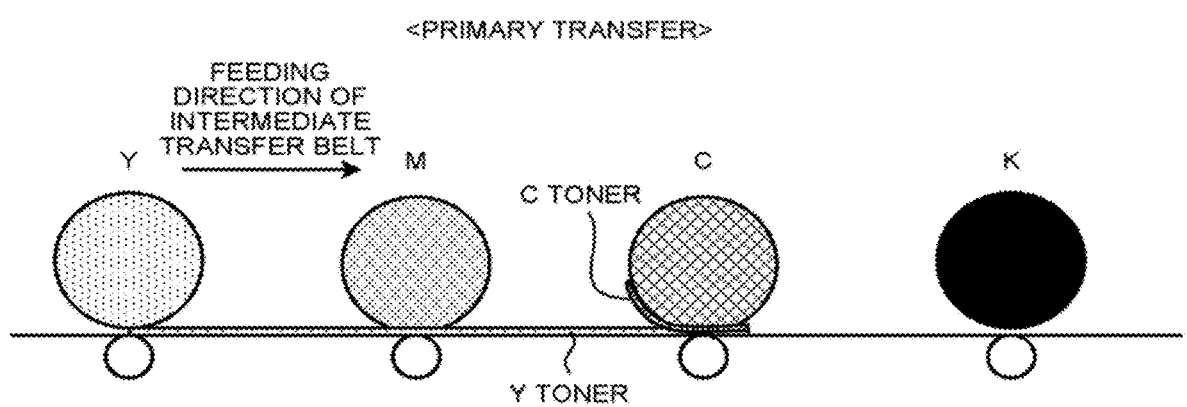
FIG. 22 is a diagram for explaining an overview of an embodiment.

The first reason is as follows. As illustrated in FIG. 22, in the primary transfer, cyan toner is transferred from above onto the underlying color (in this case, yellow). The transfer ratio at this point is reduced by the amount of the underlying yellow toner.

Figure 23:
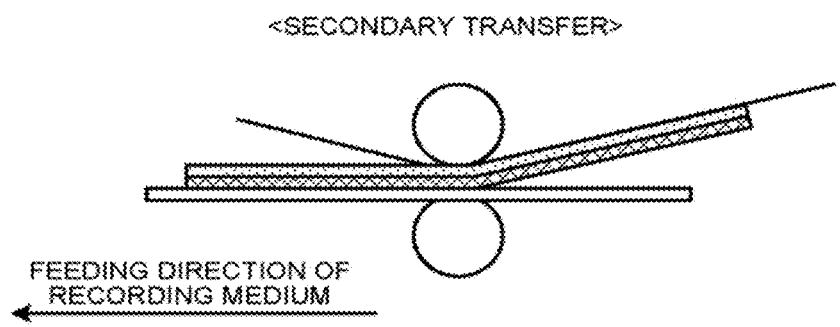
FIG. 23 is a diagram for explaining an overview of an embodiment.

The second reason is as follows. As illustrated in FIG. 23, in the secondary transfer, yellow is transferred from above onto the underlying color (in this case, cyan) on the recording medium (for example, paper). The transfer ratio at this point is reduced by the amount of the underlying cyan toner.

For the two reasons described above, the appearance of streaks produced in printing with two or more colors superimposed is changed. In this case, the transfer ratio is reduced when two or more colors are superimposed to be printed as compared with when single colors are printed. It follows that the transfer ratio may vary with color plates. In the present embodiment, it has been found that when two or more colors are superimposed to be printed, correction can be appropriately performed using a value obtained by multiplying a correction value included in a correction table for eliminating image defects produced in printing in a single color by a coefficient (correction coefficient) equal to or smaller than one. This processing eliminates the need for forming an image of a test pattern for every combination of colors and calculating the tone characteristic for each color. The density values of input image data (original data) therefore can be corrected with a simpler configuration. Specific contents of the present embodiment will be described in detail below with reference to the accompanying drawings.

FIG. 1 is a diagram illustrating an exemplary hardware configuration of an MFP 1 of the present embodiment. As illustrated in FIG. 1, the MFP 1 includes a CPU 10, an image input unit 20, a reading unit 30, a calibration memory 40, a storage unit 50, and an image output unit 60.

The CPU 10 centrally controls the operation of the entire MFP 1. The functions of the CPU 10 will be described later. The image input unit 20 receives image data from a host device. In the following description, the image data received from the host device may be referred to as "input image data". The reading unit 30 is a device for optically reading an image formed on a recording medium (for example, paper) by the image output unit 60, under the control of the CPU 10 and includes, for example, a line sensor. A variety of known configurations of scanners can be used as the configuration of the reading unit 30.

The calibration memory 40 is a device that stores therein test pattern images, scanner γ images, and patch image data in advance for use in calibration processing described later.

The storage unit 50 stores therein correction information obtained in calibration processing. More specifically, the storage unit 50 stores therein, for each of a plurality of colors, correction information in which a correction value for obtaining a target output value is associated with each of combinations of one of a plurality of density values of image data corresponding to the color and one of a plurality of positions in the main scanning direction of the image data. In this example, the storage unit 50 stores therein four pieces of correction information having one-to-one correspondence with four colors, namely, CMYK. More specific contents will be described later. As used herein, the term "main scanning direction" refers to the direction orthogonal to the feeding direction of a recording medium (in this example, paper).

The image output unit 60 is a device for forming image data such as input image data, and a test pattern image, a scanner γ image, and patch image data stored in the calibration memory 40 on a recording medium under the control of the CPU 10. More specifically, the image output unit 60 is a device for fixing a toner image on a recording medium in accordance with image data such as input image data, and a test pattern image, a scanner γ image, and patch image data stored in the calibration memory 40. The image output unit 60 is equipped with CMYK toners and includes, for each toner, an image forming unit including a photoconductor, a charger, a developing device, and a photoconductor cleaner, an exposure unit, and a fixing device. The image output unit 60 emits a light beam from the exposure unit in accordance with image data to form a toner image corresponding to each toner on the photoconductor, then transfers the toner image formed on the photoconductor onto the intermediate transfer belt (primary transfer), then transfers the toner image transferred on the intermediate transfer belt onto a recording medium (secondary transfer), and fixes the toner image transferred on the recording medium with the fixing device by heating and pressing at temperatures in a predetermined range. An image is thus formed on the recording medium. Such a configuration of the image output unit 60 is well known and a detailed description thereof is omitted here. A variety of known configurations of printer engines can be used as the configuration of the image output unit 60. It should be noted that the recording medium may not be paper.

FIG. 2 is a diagram illustrating exemplary functions of the CPU 10. As illustrated in FIG. 2, the CPU 10 includes a color converter 101, a creator 102, a calculator 103, and a corrector 104. Although for convenience of explanation, the functions pertaining to the present invention are mainly illustrated in the example in FIG. 2, the functions of the CPU 10 are not intended to be limited to those functions.

The color converter 101 converts input image data (image data received from a host device) represented by the RGB color space into data represented by the CMYK color space and then outputs the converted input image data to the corrector 104. Specific contents of the correction by the corrector 104 will be described later.

The creator 102 creates, for each of a plurality of colors (in this example, CMYK), correction information corresponding to the color, based on the read brightnesses of a plurality of test patterns obtained by forming a plurality of test pattern images on a recording medium. The test pattern images each extend in the main scanning direction and have one-to-one correspondence with a plurality of density values of image data corresponding to the color. In the present embodiment, the creator 102 calculates, for each of a plurality of colors, a second relational expression representing the relation between the density value of the image data corresponding to the color and the read brightness of the image obtained by forming image data corresponding to the color on a recording medium, from a density value included in a scanner γ image having different density values of the color at a plurality of positions in the main scanning direction and the read brightness of the scanner γ pattern obtained by forming a scanner γ image on a recording medium. The creator 102 then corrects the read brightness at each of a plurality of positions in the main scanning direction of a plurality of test patterns corresponding to the color, using the calculated second relational expression, and calculates a correction value for correcting the corrected read brightness to a target output value.

In the present embodiment, when calibration processing is executed for creating four pieces of correction information having one-to-one correspondence with four colors, namely, CMYK, first of all, the creator 102 controls the image output unit 60 such that a plurality of test pattern images corresponding to C, a plurality of test pattern images corresponding to M, a plurality of test pattern images corresponding to Y, and a plurality of test pattern images corresponding to K are formed on a recording medium. The creator 102 also controls the image output unit 60 such that a scanner γ image corresponding to C, a scanner γ image corresponding to M, a scanner γ image corresponding to K, and a scanner γ image corresponding to Y are formed on a recording medium. This processing results in a plurality of test patterns corresponding to C, a plurality of test patterns corresponding to M, a plurality of test patterns corresponding to Y, a plurality of test patterns corresponding to K, a scanner γ pattern corresponding to C, a scanner γ pattern corresponding to M, a scanner γ pattern corresponding to Y, and a scanner γ pattern corresponding to K. In the following description, a recording medium having the test patterns and the scanner γ patterns may be referred to as a calibration chart.

FIG. 3 is a diagram illustrating an exemplary calibration chart in the present embodiment. Here, the test patterns and the scanner γ pattern specifically for C among CMYK will be described. This description is applicable to the other three colors (M, Y, K). In the example in FIG. 3, a plurality of test patterns corresponding to C are constituted of a plurality of (here, 10) test patterns having one-to-one correspondence with a plurality of density values at 10% intervals (10%, 20%, 30%, 40%, 50%, 60%, 70%, 80%, 90%, 100%) of image data corresponding to C (C plate). That is, in this example, a plurality of test pattern images serving as the source of a plurality of test patterns corresponding to C have one-to-one correspondence with a plurality of density values at 10% intervals of C plate. For example, in the test pattern image corresponding to the density value "10%" of C plate, the density value is set at 10% over the entire region in the main scanning direction. This is applicable to the test pattern images corresponding to other density values.

In the example in FIG. 3, the density value of the scanner γ image serving as the source of the scanner γ pattern corresponding to C increases by 3% increments as the position in the main scanning direction changes from the left to the right in FIG. 3 (changes in 29 levels). That is, in the scanner γ image serving as the source of the scanner γ pattern corresponding to C, the density value of C plate varies among a plurality of (in this example, 29) positions in the main scanning direction.

Next, the creator 102 controls the reading unit 30 such that the calibration chart is optically read. The creator 102 then calculates, for each of the four colors (CMYK), a second relational expression representing the relation between the density value of the image data corresponding to the color and the read brightness of the image obtained by forming the image data corresponding to the color on a recording medium, from the density values in 29 levels included in the scanner γ image corresponding to the color and the read brightness of the scanner γ pattern corresponding to the color. In this example, the density value of the scanner γ image and the read brightness of the scanner γ pattern are represented by a 8-bit value (a value from 0 to 255), and the following relation holds: as the density value of the scanner γ image increases, the read brightness decreases at the position corresponding to the density value in the scanner γ pattern.

Figure 4:
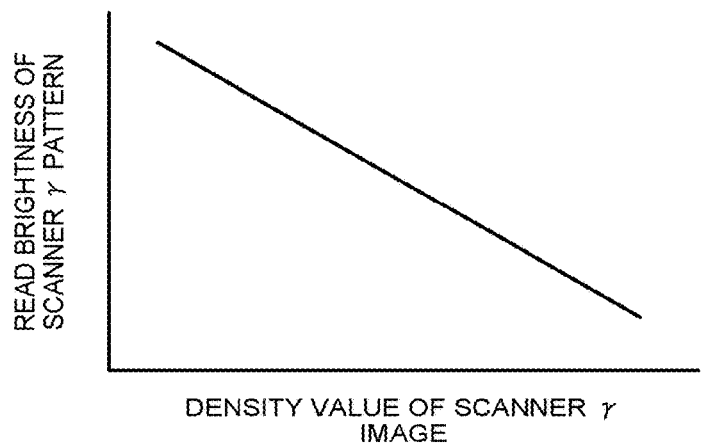
FIG. 4 is a schematic diagram illustrating an exemplary relation between the density value of a scanner γ image corresponding to C and the read brightness of a scanner γ pattern corresponding to C.

FIG. 4 is a schematic diagram illustrating an exemplary relation between the density value of the scanner γ image corresponding to C and the read brightness of the scanner γ pattern corresponding to C. In this example, the creator 102 specifies the read brightness at the corresponding position in the scanner γ pattern, for each of the density values in 29 levels included in the scanner γ image corresponding to C, and thereafter calculates the second relational expression representing the relation between the density value of C plate and the read brightness of the image of C plate formed on a recording medium, for example, using the method of least squares. For example, the second relational expression may be represented by, but not limited to, a quadratic. Alternatively, the second relational expression may be represented, for example, by a linear expression or by a cubic.

Figure 5:
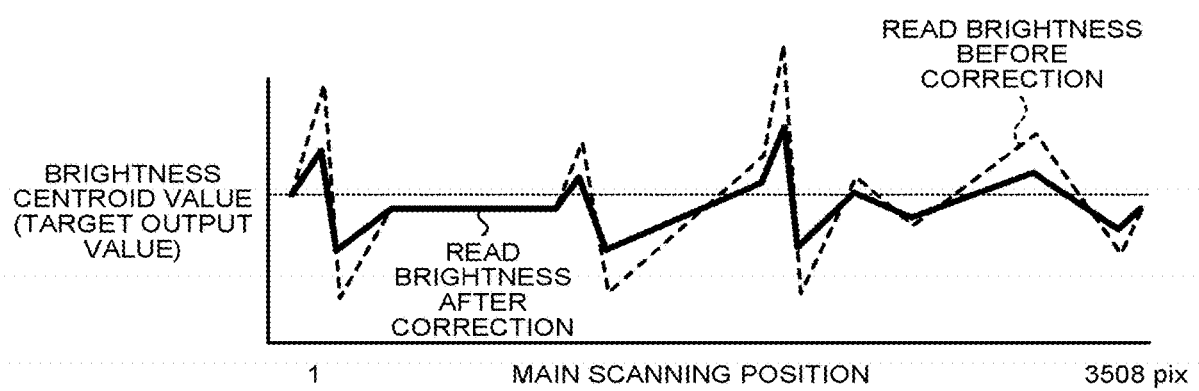
FIG. 5 is a diagram illustrating the read brightness before correction and the read brightness after correction at each of a plurality of positions in the main scanning direction of a test pattern corresponding to C.

The creator 102 corrects, for each of the four colors (CMYK), the read brightness at each of a plurality of positions in the main scanning direction of a plurality of test patterns corresponding to the color, using the second relational expression corresponding to the color. In the present embodiment, the creator 102 corrects the read brightness at each of a plurality of positions in the main scanning direction of the test pattern corresponding to a particular density value, in accordance with the slope of the second relational expression corresponding to the particular density value. Taking C as an example, for example, when the slope of the second relational expression (second relational expression corresponding to C) corresponding to the density value 30% of C plate differs from a predetermined reference value (for example, −255 indicating the slope of a straight line where the brightness value is 255 for the density 0% and the brightness value is 0 for the density 100%), the creator 102 corrects the read brightness at each of a plurality of positions in the main scanning direction of the test pattern corresponding to the density value 30% of C plate such that the slope of the second relational expression corresponding to the density value 30% of C plate has the predetermined reference value (for example −255). FIG. 5 is a diagram illustrating the read brightness before correction and the read brightness after correction at each of a plurality of positions in the main scanning direction of the test pattern corresponding to the density value 30% of C plate.

The creator 102 then calculates, for each of a plurality of positions in the main scanning direction, a correction value for setting the read brightness after correction to a target output value (for example, the centroid value of the read brightness at each of a plurality of positions in the main scanning direction) (in a different point of view, a value for correcting the density value of input image data for eliminating image defects such as vertical streaks). More specifically, for each of the four colors (CMYK), the creator 102 calculates a correction value for setting the read brightness after correction to a target output value for each of a plurality of positions in the main scanning direction, for each of a plurality of test patterns corresponding to the color. The creator 102 thus can create, for each of the four colors (CMYK), correction information in which a correction value for obtaining a target output value is associated with each of combinations of one of a plurality of density values of image data corresponding to the color and one of a plurality of positions in the main scanning direction of the image data.

In this example, there are 10 density values, namely, 10%, 20%, 30%, 40%, 50%, 60%, 70%, 80%, 90%, 100%, having one-to-one correspondence with a plurality of test patterns of one color among CMYK. For example, the creator 102 may perform interpolation (for example, linear interpolation) to calculate a correction value corresponding to a density value other than those values, for each main scanning position. The thus-generated four pieces of correction information having one-to-one correspondence with the four colors (CMYK) can be thought to be information for eliminating image defects such as vertical streaks produced in printing in one color.

Returning to FIG. 2, a further description will be given. The calculator 103 calculates, for each of a plurality of colors (in this example, CMYK), a first relational expression representing the relation between a correction coefficient and the proportion of the color, based on correspondence information that predefines the correspondence between color information of a patch and a correction coefficient. The patch is obtained by forming, on a recording medium, patch image data in which the density value (predetermined density value) of a mixed color obtained by mixing two colors including the color is evenly (uniformly) set for the pixels in a predetermined region. The correction coefficient indicates a coefficient by which each correction value included in the correction information corresponding to the color is multiplied. In the present embodiment, the calculator 103 performs control, for each of a plurality of colors, to output a patch of a mixed color including the color (controls the image output unit 60 such that a toner image is fixed on a recording medium in accordance with the patch image data serving as the source of the patch), and thereafter refers to the correspondence information corresponding to the patch of the mixed color including the color to calculate a first relational expression such that the correction coefficient of the color corresponding to color information indicating the value obtained by converting the read brightness of the already output patch of the mixed color including the color into the L*a*b system is the correction coefficient when the proportion of the color is 50%, and the correction coefficient when the proportion of the color is 100% is one. Here, the correction coefficient is a value equal to or smaller than one and the value of the correction coefficient is smaller as the proportion of the corresponding color is smaller.

Figure 6:
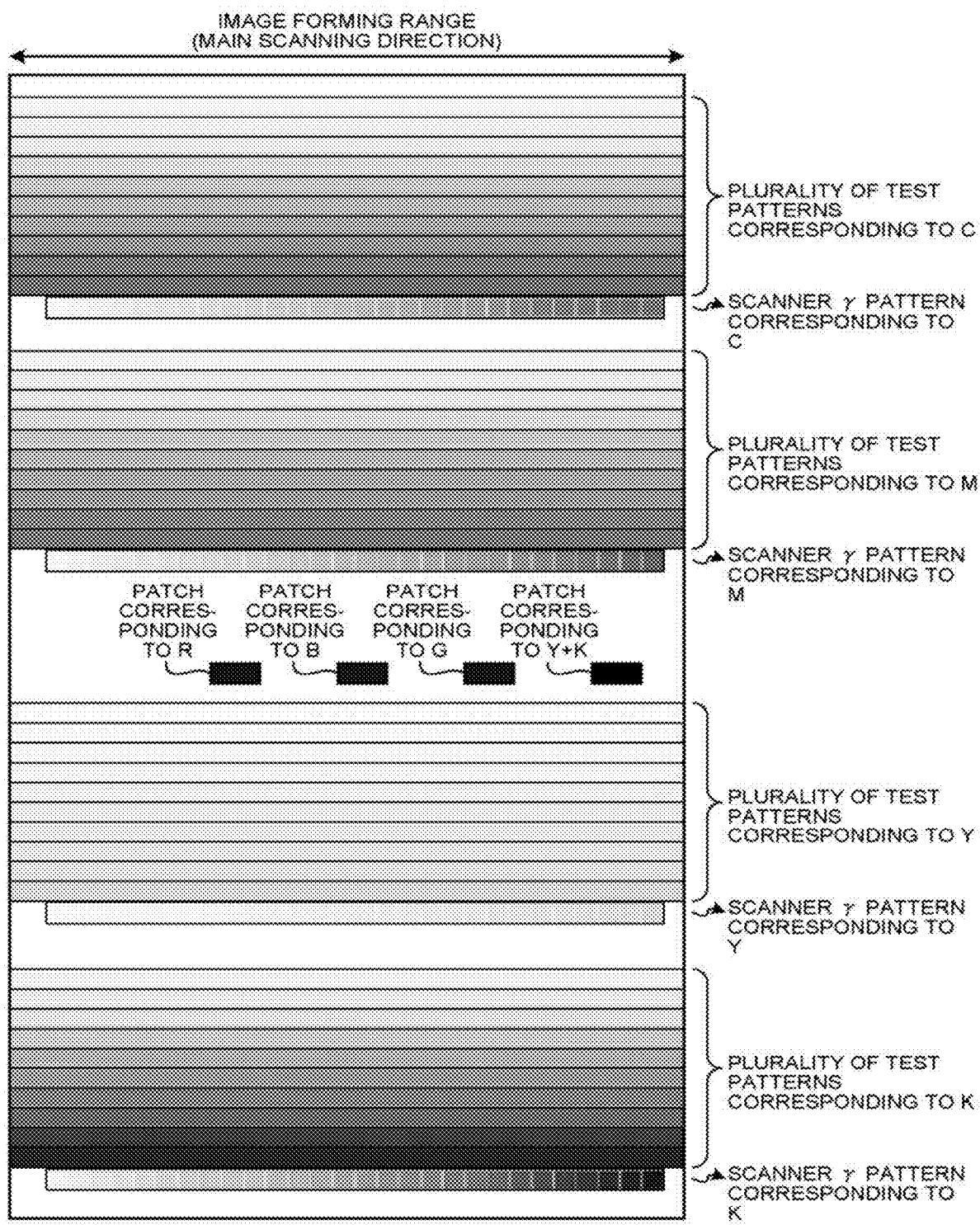
FIG. 6 is a diagram illustrating an exemplary calibration chart.

In the present embodiment, the processing of calculating the first relational expression is performed in the calibration processing. Thus, when the calibration processing is performed, the calculator 103 controls the image output unit 60 so as to form patch image data corresponding to red (R), which is a mixed color of Y and M, patch image data corresponding to green (G), which is a mixed color of Y and C, patch image data corresponding to blue (B), which is a mixed color of M and C, and patch image data corresponding to a mixed color of Y and K, on a recording medium. That is, in this example, as illustrated in FIG. 6, the calibration chart includes a patch for R, a patch for G, a patch for B, and a patch for the Y and K mixed color. Alternatively, the processing of calculating the first relational expression may be performed, for example, separately from the calibration processing.

After the calibration chart is created as described above, the reading unit 30 performs reading. The calculator 103 then converts the read brightness of each of the patch for R, the patch for G, the patch for B, and the patch for the Y and K mixed color into the L*a*b system. In this example, the output value of the reading unit 30 is represented by the standard RGB (sRGB) color space, which is converted by the calculator 103 into the XYZ color space and then into the L*a*b system. A variety of known techniques can be used as the conversion method.

In this example, the image (read image) obtained by reading by the reading unit 30 is an 8-bit image, and the processing is performed for normalizing the value 255 into one. For example, the value 51 normalized is represented as 51/255=0.2. For convenience of explanation, let the normalized read value of R be R', the normalized read value of G be G', and the normalized read value of B be B'. If the value of R' is equal to or smaller than 0.040450, the relation between R' and R (original R) used in conversion into the XYZ space can be represented by Expression 1 below.

$$R = R'/12.92 \quad (R' \leq 0.040450) \quad \text{(Expression 1)}$$

If the value of R' exceeds 0.040450, the relation between R' and R (original R) used in conversion into the XYZ space can be represented by Expression 2 below.

$$R = [(R'+0.055)/1.055]^{2.4} \quad (R' > 0.040450) \quad \text{(Expression 2)}$$

Similarly, if the value of G' is equal to or smaller than 0.040450, the relation between G' and G (original G) used in conversion into the XYZ space can be represented by Expression 3 below.

$$G = G'/12.92 \quad (G' \leq 0.040450) \quad \text{(Expression 3)}$$

Similarly, if the value of G' exceeds 0.040450, the relation between G' and G (original G) used in conversion into the XYZ space can be represented by Expression 4 below.

$$G = [(G'+0.055)/1.055]^{2.4} \quad (G' > 0.040450) \quad \text{(Expression 4)}$$

Similarly, if the value of B' is equal to or smaller than 0.040450, the relation between B' and B (original B) used in conversion into the XYZ space can be represented by Expression 5 below.

$$B = B'/12.92 \quad (B' \leq 0.040450) \quad \text{(Expression 5)}$$

Similarly, if the value of B' exceeds 0.040450, the relation between B' and B (original B) used in conversion into the XYZ space can be represented by Expression 6 below.

$$B = [(B'+0.055)/1.055]^{2.4} \quad (B' > 0.040450) \quad \text{(Expression 6)}$$

The calculator 103 then converts the original RGB (linear RGB) into the values in the XYZ space. This conversion can be represented by, for example, Expression 7 below.

$$\begin{pmatrix} X \\ Y \\ Z \end{pmatrix} = \begin{pmatrix} 0.436041 & 0.385113 & 0.143046 \\ 0.222485 & 0.716905 & 0.060610 \\ 0.013920 & 0.097067 & 0.713913 \end{pmatrix} \begin{pmatrix} R \\ G \\ B \end{pmatrix} \quad \text{(Expression 7)}$$

The calculator 103 then converts the values in the XYZ color space into the values in the L*a*b color space, using Expression 8 below.

$$f(t) = \begin{cases} t^{1/3} & \text{if } t > (6/29)^3 = 0.008856 \ldots \\ [(29/3)^3 t + 16]/16 & \text{other than the above} \end{cases} \quad \text{(Expression 8)}$$

$$L^* = 116 f(Y/Yn) - 16$$

$$a^* = 500[f(X/Xn) - f(Y/Yn)]$$

$$b^* = 200[f(Y/Yn) - f(Z/Zn)]$$

The method of calculating the first relational expression corresponding to Y will be described below, taking, as an example, the correspondence information obtained by experiments and the like that predefines the correspondence between the color information (in this example, the value represented by the L*a*b system) of the patch for R and the correction coefficient of each of Y and M included in R. The method of calculating the first relational expression corresponding to each of the other three colors (C, M, K) can be considered in the same way. In the example described here, the density value of patch image data corresponding to the patch for R is 100% (the density value of each of Y and M is 100%). However, any density value of patch image data can be set as long as correspondence information corresponding to a density value that may be set (density value of patch image data) is prepared in advance.

Figure 7:
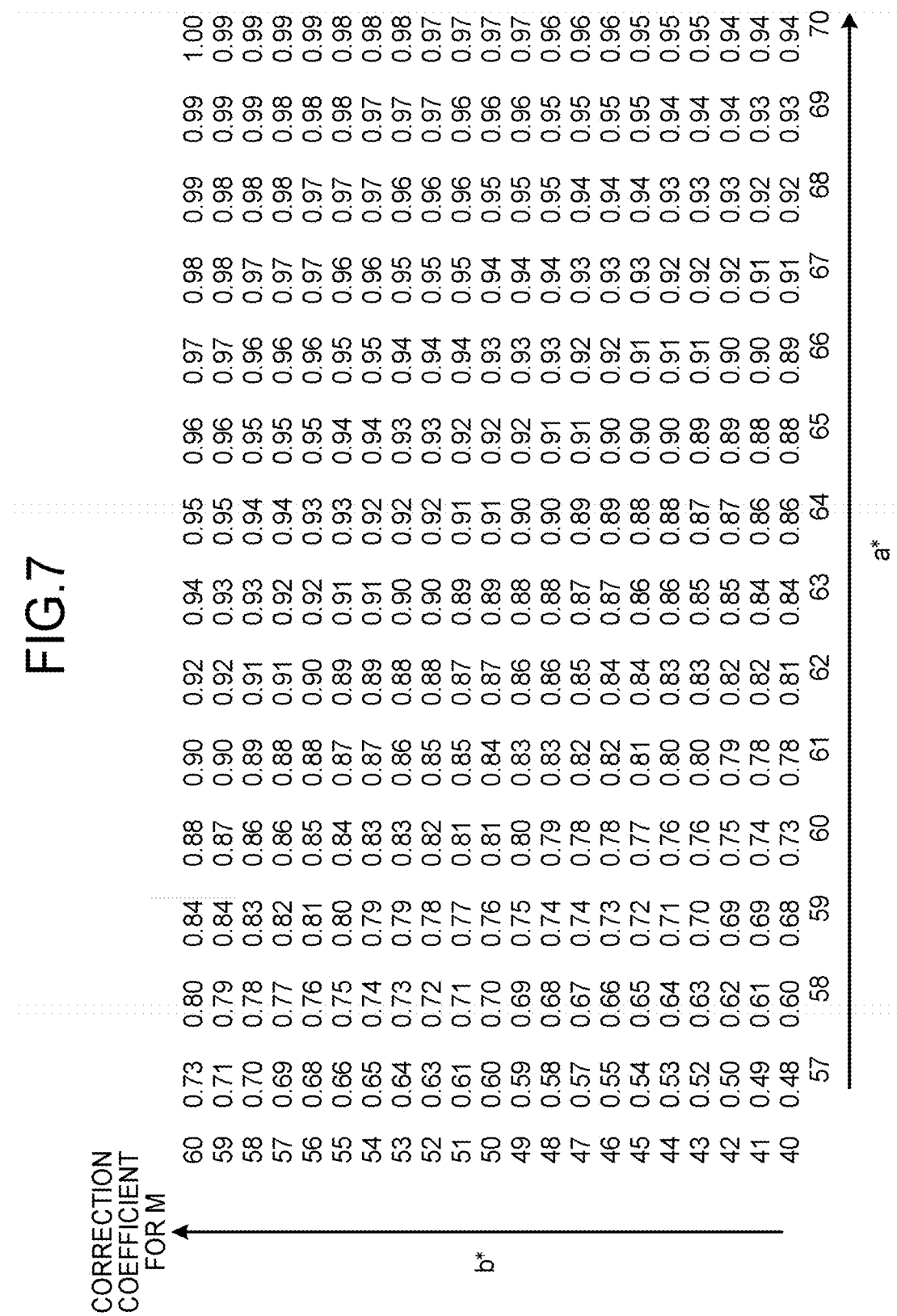
FIG. 7 is a diagram illustrating exemplary correspondence information.
Figure 8:
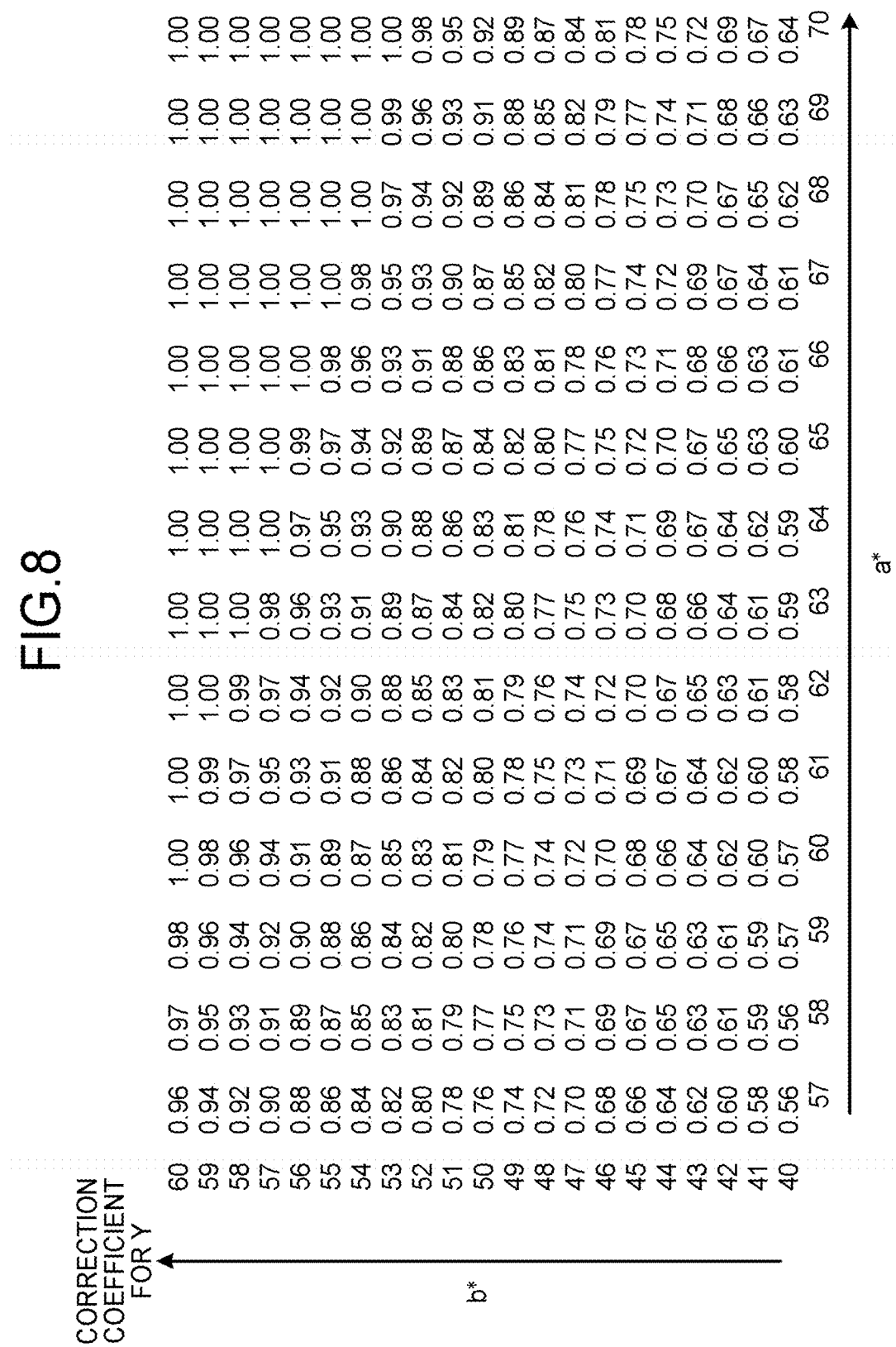
FIG. 8 is a diagram illustrating exemplary correspondence information.

The L*a*b system is a perceptually uniform color system and has a nonlinear relation with the actual amount of toner. In this example, therefore, the correspondence information in a table format as illustrated in FIG. 7 and FIG. 8 can be used to obtain a correction coefficient for M and a correction coefficient for Y, respectively, corresponding to the a*b* value when the read brightness of the already output patch for R is converted into the L*a*b system. FIG. 7 is a diagram illustrating exemplary correspondence information that predefines the correspondence between the a*b* value of a patch for R and the correction coefficient for M. FIG. 8 is a diagram illustrating exemplary correspondence information that predefines the correspondence between the a*b* value of a patch for R and the correction coefficient for Y. These pieces of correspondence information are stored in advance, for example, in the storage unit 50.

Similarly, the correspondence information that predefines the correspondence between the a*b* value of a patch for G and the correction coefficient for Y and the correspondence information that predefines the correspondence between the a*b* value of a patch for G and the correction coefficient for C are also stored in advance in, for example, the storage unit 50. The correspondence information that predefines the correspondence between the a*b* value of a patch for B and the correction coefficient for M and the correspondence information that predefines the correspondence between the a*b* value of a patch for B and the correction coefficient for C are also stored in advance in, for example, the storage unit 50.

"K" has almost no effect on hue (a*b*), and "Y" contributes a little to lightness L* and contributes much to b*. For the patch for the Y and K mixed color, therefore, the correspondence information that predefines the correspondence between the L*b* value of the Y and K mixed color and the correction coefficient for Y and the correspondence information that predefines the correspondence between the L*b* value of the Y and K mixed color and the correction coefficient for K are stored in advance in, for example, the storage unit 50.

In the example described below, the correction coefficient for Y corresponding to the a*b* value is 0.7 when the read brightness of the already output patch for R is converted into the L*a*b system. In this example, the patch image data (the density value of R is 100%) serving as the source of the already output patch for R is constituted of Y plate (density value of Y is 100%) and M plate (density value of M is 100%), and then the proportion of Y (the proportion of Y plate) is 50%. That is, the correction coefficient "0.7" obtained from the correspondence information is the correction coefficient when the proportion of Y is 50%. When the proportion of Y is 100%, the correction information (correction information corresponding to Y) for eliminating image defects produced in printing in Y alone can be used as it is, and the correction coefficient is therefore "1".

The calculator 103 obtains a straight line that approximates the relation between the proportion of Y and the correction coefficient, from a set of the proportion of Y indicating "100%" and the correction coefficient indicating "1" and a set of the proportion of Y indicating "50%" and correction coefficient indicating "0.7". The expression representing the straight line is written as the correction coefficient=a×the proportion of Y+b, then a=(1.0−0.7)/(100%−50%)=0.6 is obtained. The obtained a=0.6 is then substituted into the expression representing the straight line, and then b=0.4 is obtained. In this case, therefore, the expression represented by the correction coefficient=0.6×the proportion of Y+0.4 can be calculated as the first relational expression.

In the present embodiment, the patches for mixed colors each including Y include a patch for R as well as a patch for G and a patch for the Y and K mixed color. Therefore, by referring to the correspondence information corresponding to each of these patches, the correction coefficient for Y when the proportion of Y is 50% is obtained, and the average value of these correction coefficients may be obtained as the correction coefficient for Y when the proportion of Y is 50%. The thus-obtained correction coefficient for Y then may be used to calculate the first relational expression.

The calculator 103 stores the thus-calculated, four first relational expressions having one-to-one correspondence with the four colors (CMYK) in, for example, the storage unit 50.

Returning to FIG. 2, a further description will be given. When a pixel in the input image data includes two or more colors, the corrector 104 corrects, for each of the two or more colors, the density value of the color, using a value smaller than the correction value corresponding to a combination of the density value of the color and the position of the pixel in the main scanning direction. In the present embodiment, when a pixel in the input image data includes two or more colors, the corrector 104 calculates, for each of the two or more colors, a correction coefficient by substituting the proportion of the color included in the pixel into the first relational expression corresponding to the color and then corrects the density value of the color using the value obtained by multiplying the correction value corresponding to the combination of the density value of the color and the position of the pixel in the main scanning direction by the calculated correction coefficient.

In the present embodiment, the functions of the color converter 101, the creator 102, the calculator 103, and the corrector 104 described above are implemented by the CPU 10 executing a computer program stored in, for example, the storage unit 50. Alternatively, for example, at least some of the functions of the color converter 101, the creator 102, the calculator 103, and the corrector 104 may be implemented by a dedicated hardware circuit (for example, semiconductor integrated circuit). Alternatively, for example, a plurality of CPUs 10 may be provided, and the functions of the color converter 101, the creator 102, the calculator 103, and the corrector 104 may be distributed over the CPUs 10.

In the present embodiment, a combination of the CPU 10 and the storage unit 50 is thought to correspond to the image processing apparatus according to the present invention.

Figure 9:
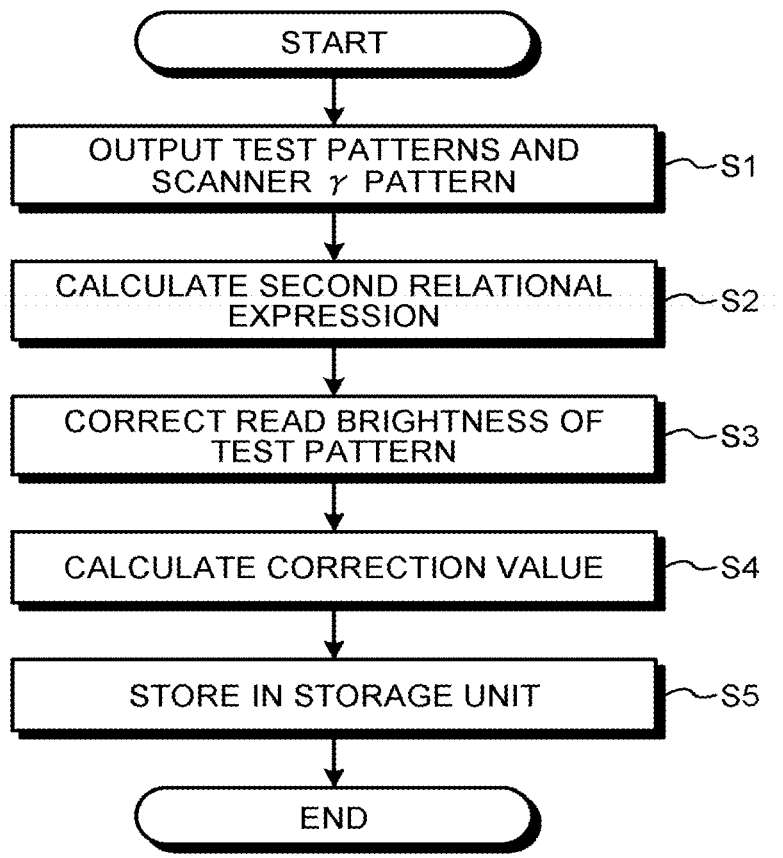
FIG. 9 is a flowchart illustrating an exemplary process of creating correction information.

FIG. 9 is a flowchart illustrating an exemplary process of creating correction information in the calibration processing. First, the creator 102 performs control to output, for each of the four colors (CMYK), test patterns and a scanner γ pattern corresponding to the color (step S1) and creates a calibration chart.

The creator 102 then controls the reading unit 30 such that the calibration chart is optically read, and calculates the second relational expression for each of the four colors (CMYK), from density values in 29 levels included in the scanner γ image corresponding to the color and the read brightness of the scanner γ pattern corresponding to the color (step S2). The specific contents are as described above.

The creator 102 then corrects, for each of the four colors (CMYK), the read brightness at each of a plurality of positions in the main scanning direction of a plurality of test patterns corresponding to the color, using the second relational expression corresponding to the color (step S3). The specific contents are as described above.

The creator 102 then calculates, for each of the four colors (CMYK), a correction value for setting the read brightness after correction to a target output value for each of a plurality of positions in the main scanning direction, for each of a plurality of test patterns corresponding to the color (step S4). The specific contents are as described above.

Through the method described above, the creator 102 creates, for each of the four colors (CMYK), correction information in which a correction value for obtaining a target output value is associated with each of combinations of one of a plurality of density values of image data corresponding to the color and one of a plurality of positions in the main scanning direction of the image data, and stores the created correction information in the storage unit 50 (step S5).

Figure 10:
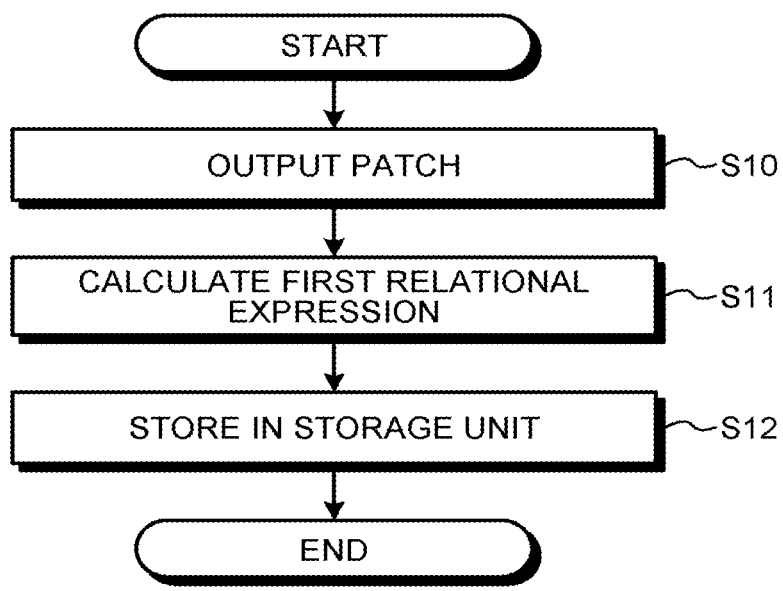
FIG. 10 is a flowchart illustrating an exemplary process of calculating a first relational expression.

FIG. 10 is a flowchart illustrating an exemplary process of calculating the first relational expression in the calibration processing. First, the calculator 103 performs control to output a patch for R, a patch for G, a patch for B, and a patch for the Y and K mixed color (step S10).

The calculator 103 then refers to, for each of the four colors (CMYK), the correspondence information corresponding to a patch for a mixed color including the color to calculate the first relational expression such that the correction coefficient of the color corresponding to color information indicating the value obtained by converting the read brightness of the output patch into the L*a*b system is the correction coefficient when the proportion of the color is 50%, and the correction coefficient when the proportion of the color is 100% is one (step S11). The specific contents are as described above.

The calculator 103 then stores the first relational expression calculated for each of the four colors (CMYK) in the storage unit 50 (step S22).

Figure 11:
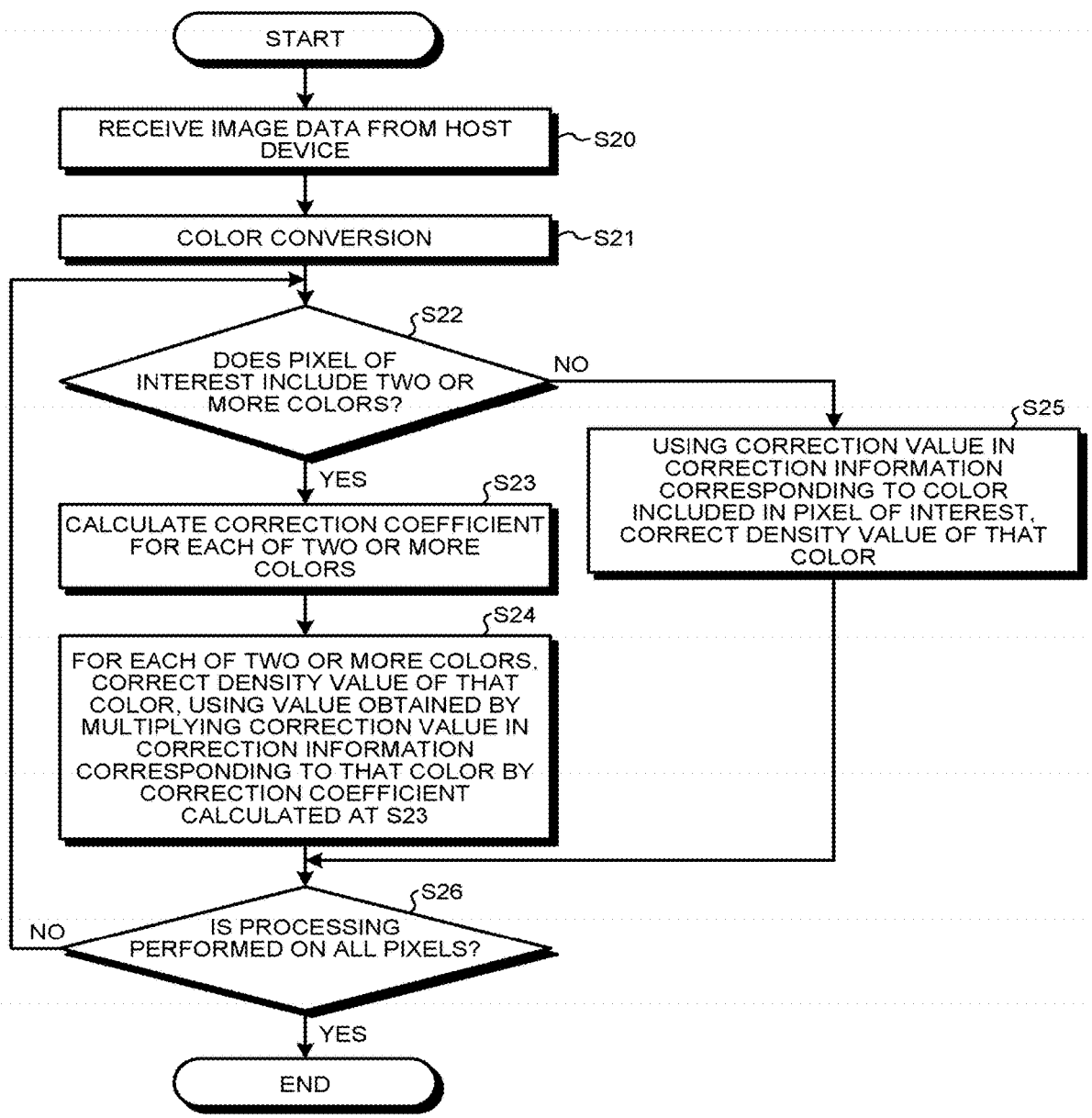
FIG. 11 is a flowchart illustrating exemplary operation of the CPU when image data is received from a host device.

FIG. 11 is a flowchart illustrating exemplary operation of the CPU 10 (corrector 104) when the image input unit 20 receives image data from a host device. When the image input unit 20 receives image data from a host device (step S20), the color converter 101 converts the input image data (the image data received from the host device) represented by the RGB color space into data represented by the CMYK color space (step S21) and outputs the converted input image data to the corrector 104. The corrector 104 successively selects any one of a plurality of pixels included in the color-converted input image data, as a pixel of interest, and performs the following processing every time a pixel of interest is selected. First, the corrector 104 determines whether the pixel of interest includes two or more colors (whether it is constituted of two or more plates) (step S22).

If the pixel of interest includes two or more colors (Yes at step S22), the corrector 104 calculates, for each of the two or more colors, a correction coefficient by substituting the proportion of the color included in the pixel of interest into the first relational expression corresponding to the color (step S23).

The corrector 104 then corrects, for each of the two or more colors, the density value of the color in the pixel of interest, using the value obtained by multiplying the correction value in the correction information corresponding to the color, that is, the correction value corresponding to the combination of the density value of the color (the density value of the plate of the color) in the pixel of interest and the position of the pixel of interest in the main scanning direction in the correction information corresponding to the color, by the correction coefficient calculated at step S23 (step S24).

At step S22 above, if it is determined that the pixel of interest does not include two or more colors (No at step S22), the corrector 104 corrects the density value of the color in the pixel of interest, using the correction value in the correction information corresponding to the color included in the pixel of interest (the correction value corresponding to the combination of the density value of the color in the pixel of interest and the position of the pixel of interest in the main scanning direction) (step S25).

If the processing described above has been performed on all the pixels (Yes at step S26), the process ends. If there exists any pixel not subjected to the processing above (No at step S26), the processing subsequent to step S22 is repeated.

As described above, in the present embodiment, when a pixel in the input image data includes two or more colors, for each of the two or more colors, the density value of the color is corrected using a value smaller than the correction value corresponding to the combination of the density value of the color and the position of the pixel in the main scanning direction. That is, when two or more colors are superimposed on each other to be printed, the density value of input image data is corrected using the value obtained by multiplying the correction value included in the correction information for eliminating image defects produced in printing in a single color by a correction coefficient equal to or smaller than one, whereby the density value of input image data can be corrected with a simpler configuration, because there is no need for forming an image of a test pattern for every combination of colors and calculating the tone characteristic of each color.

Second Embodiment

A second embodiment will now be described. A description of the configuration in common with the foregoing first embodiment will be omitted as appropriate. In the present embodiment, in order to eliminate right-left density deviations in the output device (in this example, the image output unit 60), the creator 102 calculates the second relational expression after correcting the read brightness at each of a plurality of positions in the main scanning direction of a scanner γ pattern, based on the read brightness at the corresponding position of each of a plurality of test patterns.

Figure 12:
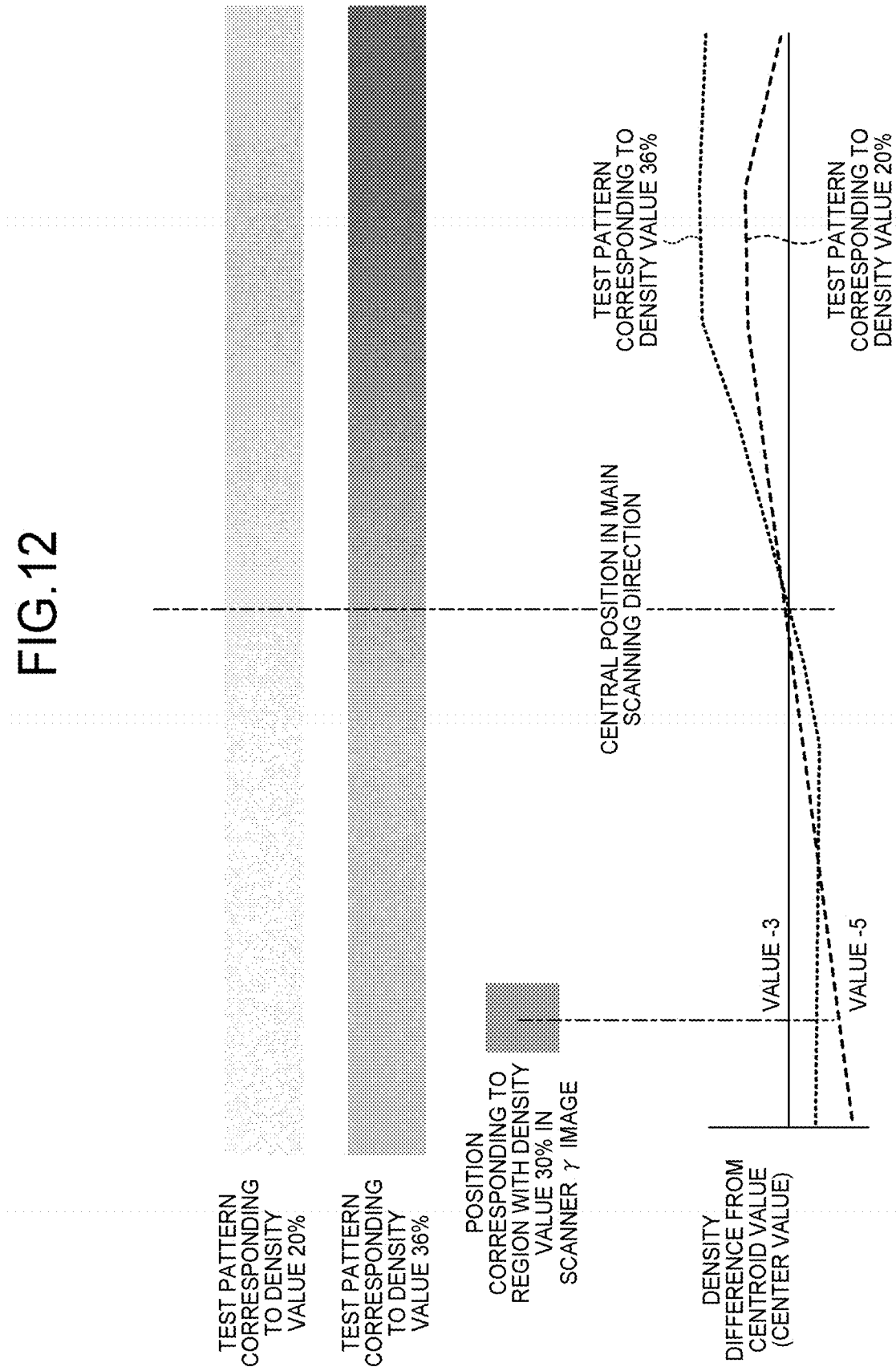
FIG. 12 is a diagram for explaining correction by a creator.

For example, as illustrated in FIG. 12, in the scanner γ pattern corresponding to one color, at the position (the position in the main scanning direction) corresponding to the region with the density value 30% in the scanner γ image serving as the source of the scanner γ pattern, the test pattern corresponding to the density value 20% of the color is deviated by a value −5 and the test pattern corresponding to the density value 36% is deviated by a value −3 from the centroid position (central position) of the read brightness. In this case, supposing the deviation (which may be considered as a correction value) at the density value 30% is proportional to the density value, this correction value can be calculated as follows: (−5×(30−20)+(−3)×(36−30))/(36−20) =−3.68. The creator 102 therefore performs a correction to increase the read brightness by the value 3.68 at the position in the scanner γ pattern that corresponds to the region with the density value 30% in the scanner γ image serving as the source of the scanner γ pattern. The similar correction is performed on the read brightness at a position in the scanner γ pattern that corresponds to a region with another density value in the scanner γ image.

Third Embodiment

Figure 13:
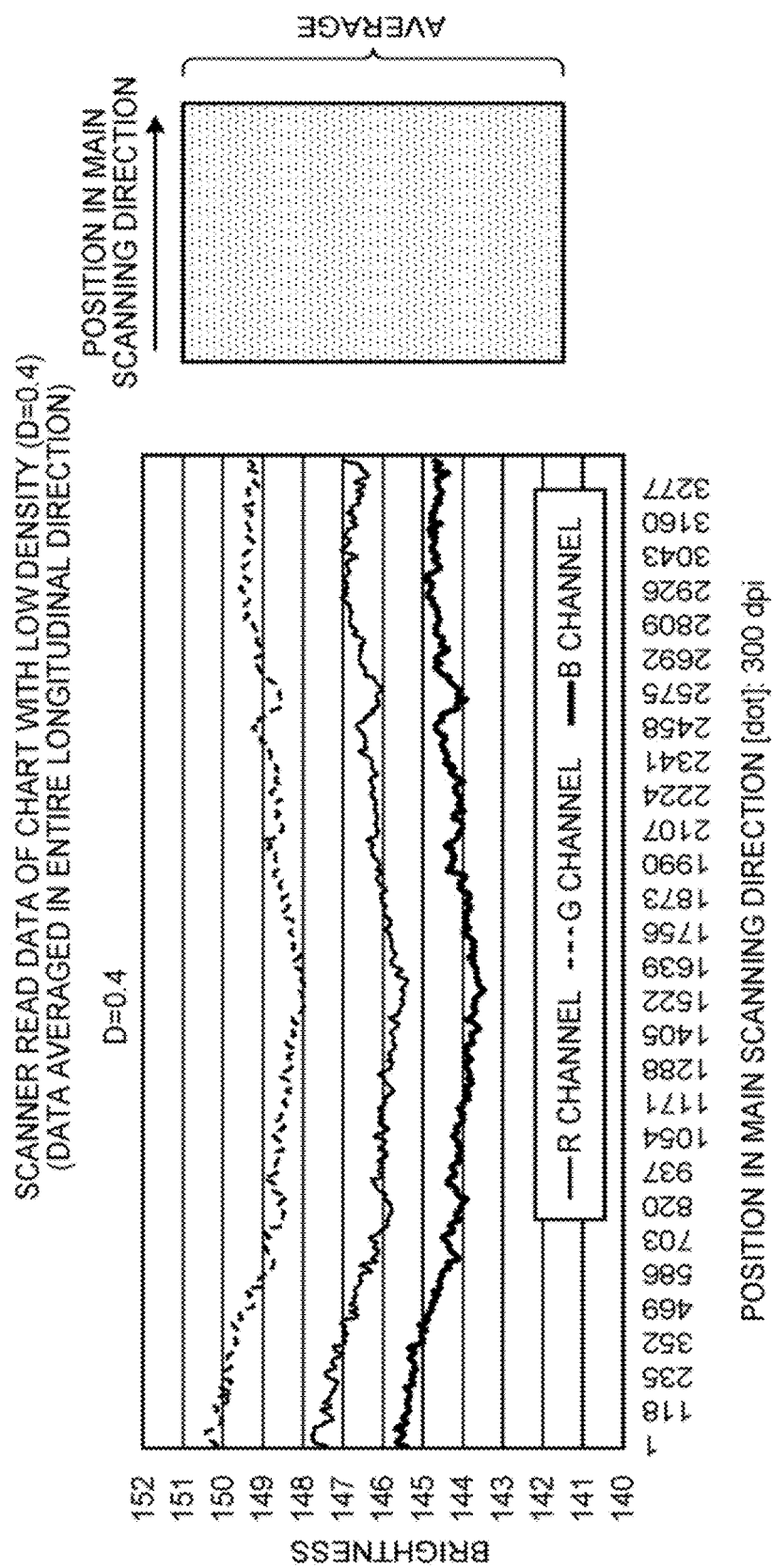
FIG. 13 is a diagram for explaining streaks or color unevenness originating from a scanner.
Figure 14:
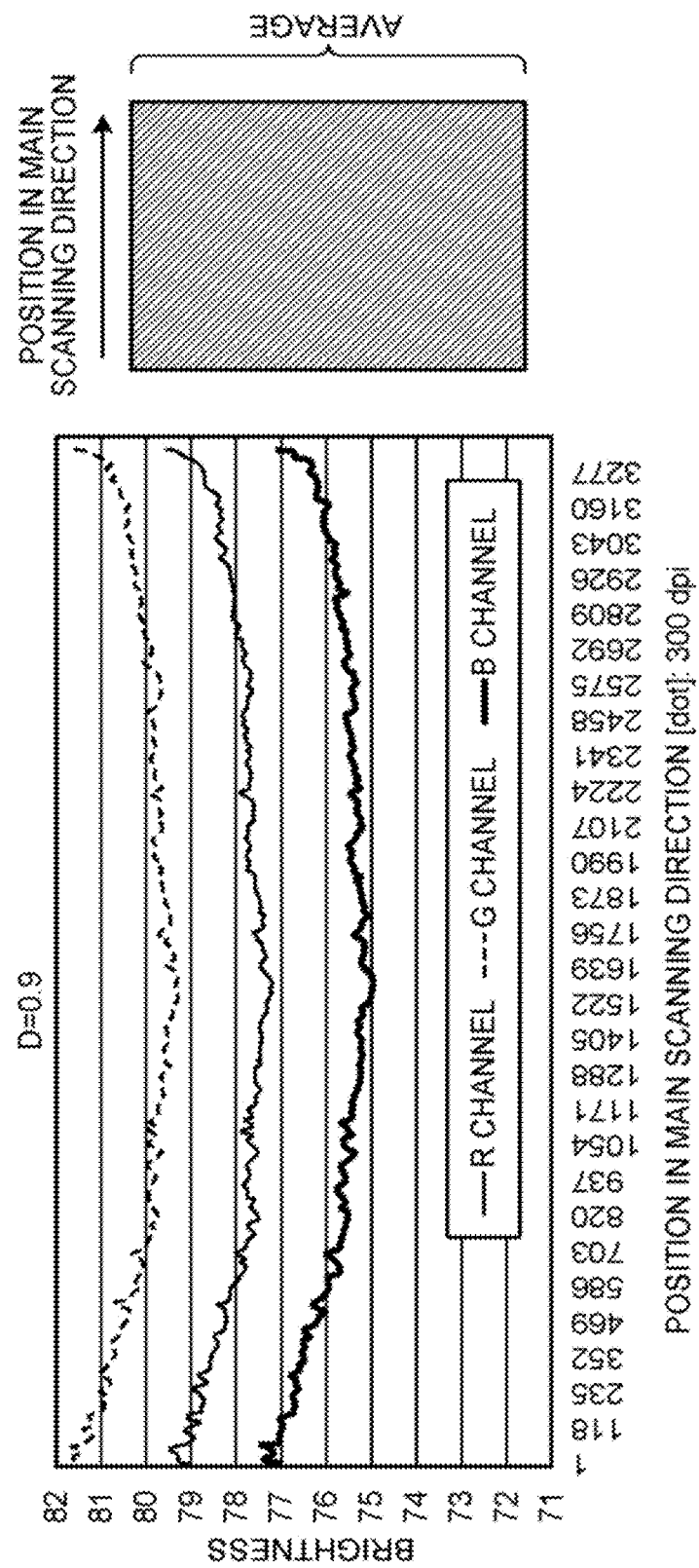
FIG. 14 is a diagram for explaining streaks or color unevenness originating from a scanner.
Figure 15:
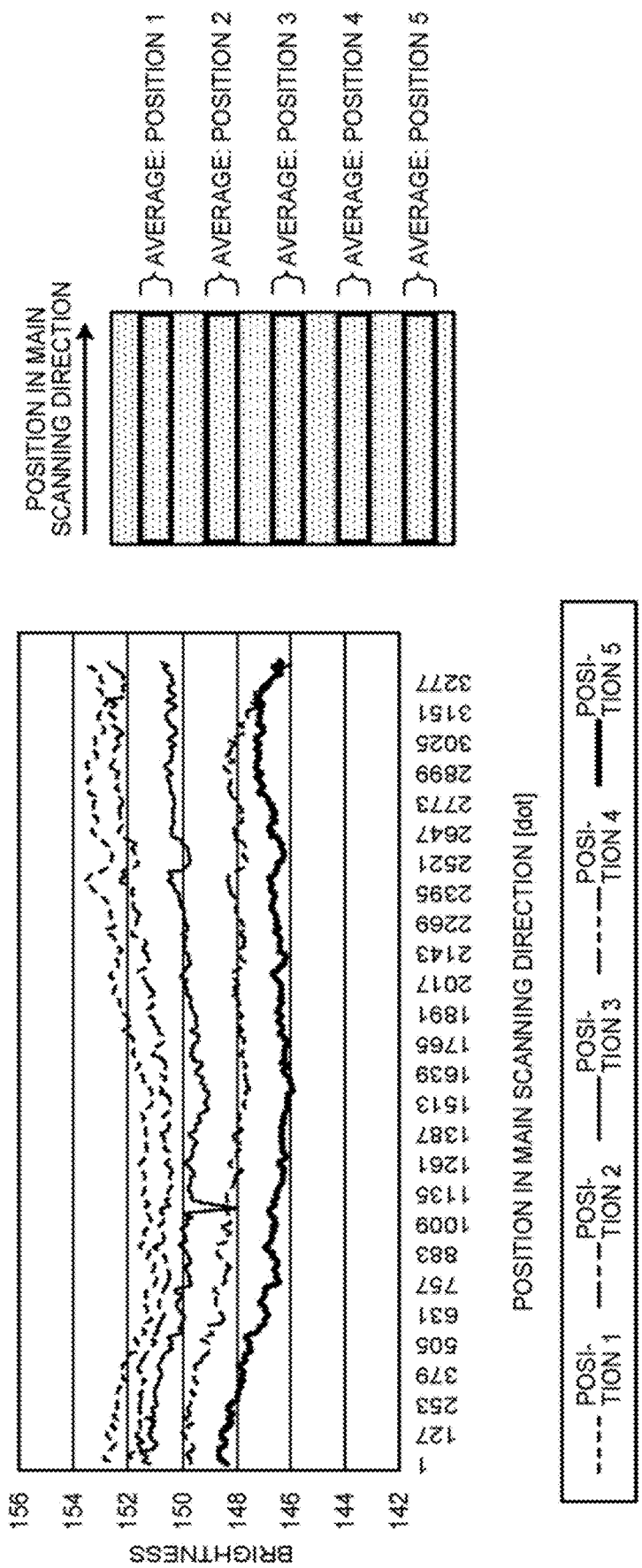
FIG. 15 is a diagram for explaining streaks or color unevenness originating from a scanner.

A third embodiment will now be described. A description of the configuration in common with the foregoing embodiments will be omitted as appropriate. If the scanner or the line sensor equivalent to the reading unit 30 itself has read streaks or color deviations, when a test pattern corresponding to a uniform density is read, the read brightness slightly varies as illustrated in FIG. 13 and FIG. 14. When the densities of test patterns each corresponding to a uniform density are different from each other, the tendencies of the read deviations also differ. As illustrated in FIG. 15, a read error of the scanner (reading unit 30) occurs also in the recording medium feeding direction (sub-scanning direction).

Figure 16:
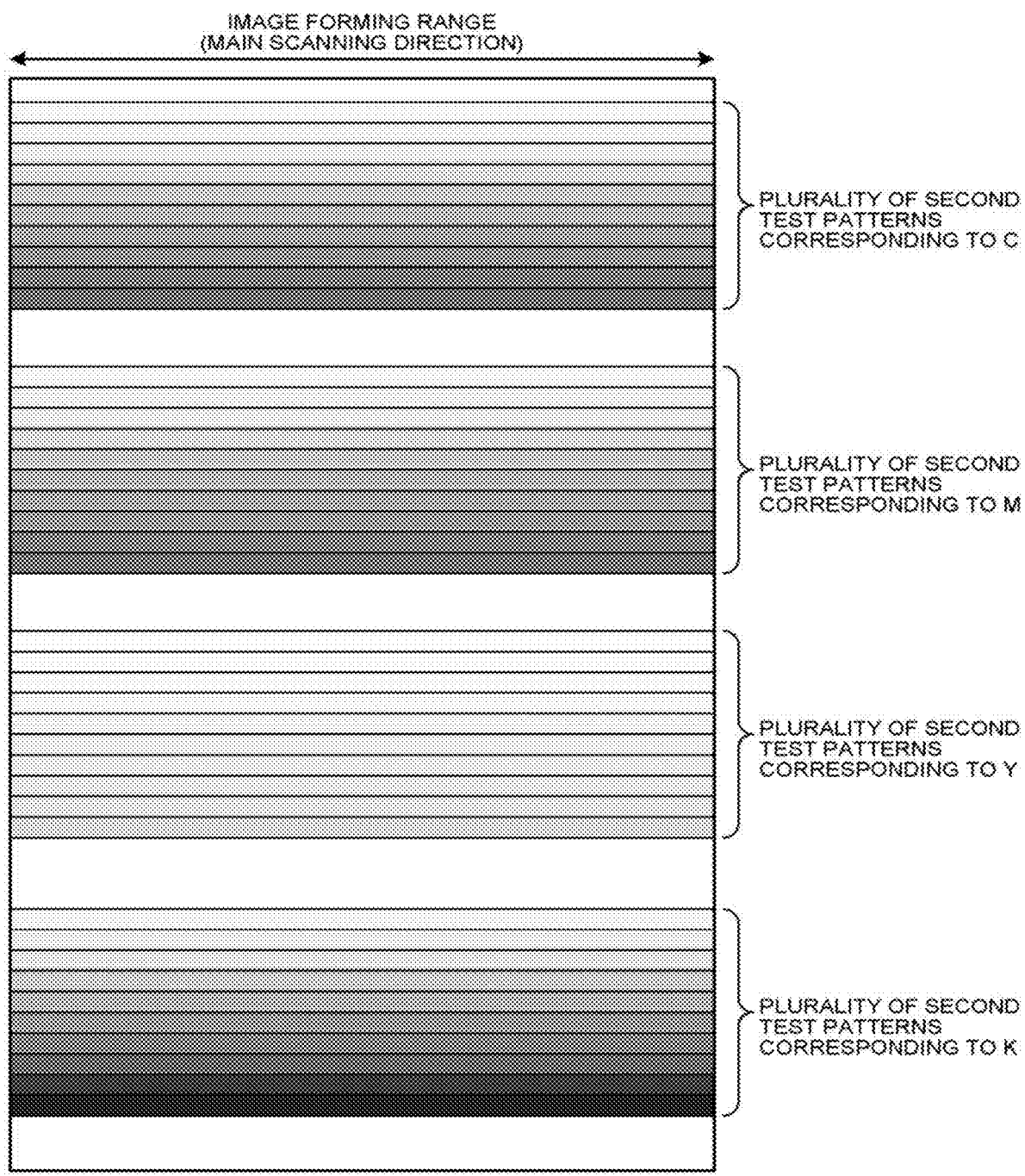
FIG. 16 is a diagram illustrating an exemplary test chart.

In order to solve the problem above, in the present embodiment, a chart for calibration is prepared in advance (for example, prepared in advance by offset printing without using the MFP 1). In the chart for calibration, for each of a plurality of colors, a plurality of second test patterns are printed, each of which extends in the main scanning direction and which have one-to-one correspondence with a plurality of density values (in this example, 10 tones) corresponding to the color. FIG. 16 is a diagram illustrating an exemplary chart for calibration. The MFP 1 further includes the function (second creator) of creating, for each of a plurality of colors, second correction information in which a second correction value is associated with each of a plurality of positions in the main scanning direction of a plurality of second test patterns corresponding to the color. The second correction value is based on the difference between the read brightness at the position and the read brightness at a reference position indicating the position serving as a reference among a plurality of positions. The creator 102 corrects, for each of a plurality of colors, the correction value for each of a plurality of positions in the main scanning direction of a plurality of test patterns corresponding to the color, using the second correction value associated with the position. The second creator calculates, for each of combinations of one of a plurality of second test patterns and one of a plurality of positions in the main scanning direction, as the read brightness at the position, a value obtained by averaging the read brightnesses of the second test pattern over the sub-scanning direction orthogonal to the main scanning direction. This processing can eliminate the effects of streaks or color unevenness originating from the scanner.

Although the creator 102 also serves the function of the second creator in the present embodiment, for example, the second creator may be provided independently of the creator 102.

Figure 17:
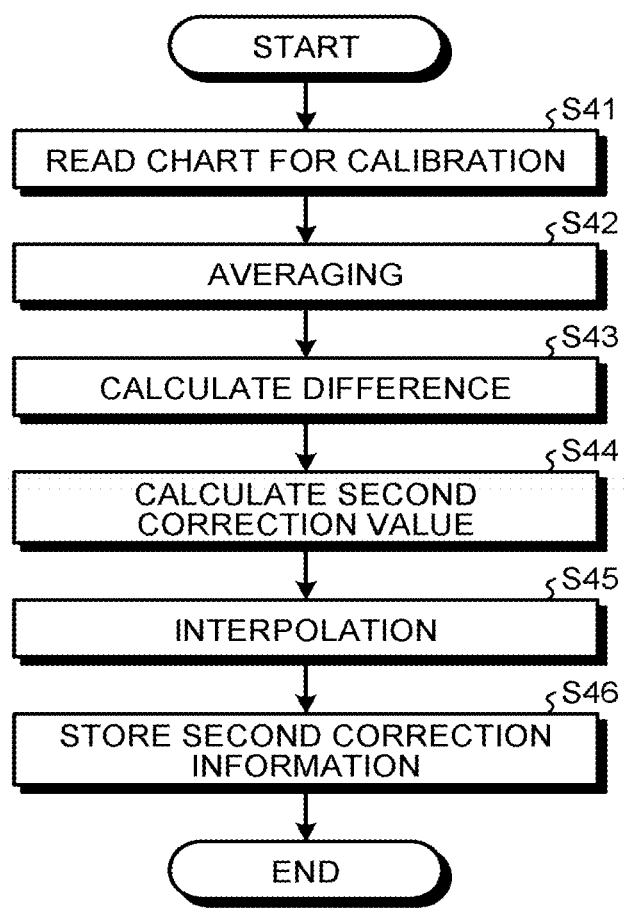
FIG. 17 is a flowchart illustrating specific contents of a process of generating second correction information.

FIG. 17 is a flowchart illustrating an exemplary process of generating the second correction information. As illustrated in FIG. 17, first, the creator 102 controls the reading unit 30 such that the chart for calibration prepared in advance is optically read (step S41). The creator 102 then calculates, for each of combinations of one of a plurality of second test patterns and one of a plurality of positions in the main scanning direction, as the read brightness at the position, a value obtained by averaging the read brightnesses of the second test pattern over the sub-scanning direction (in this example, over 20 mm in the longitudinal direction) (step S42). The creator 102 then calculates, for each of combinations of one of a plurality of second test patterns and one of a plurality of positions in the main scanning direction, the difference between the read brightness at the position obtained at step S42 and the read brightness at the reference position obtained at step S42 (step S43). In this example, the reference position is the central position among a plurality of positions in the main scanning direction. Alternatively, for example, any given position may be set as the reference position, or the centroid position in the entire range of main scanning may be set as the reference position.

The creator 102 then calculates, for each of a plurality of test patterns, the second correction value by reversing the plus/minus sign of the difference obtained at step S43, for each of a plurality of positions in the main scanning direction of the test pattern (step S44). The creator 102 then performs interpolation to calculate the second correction values for 256 tones for each main scanning position (step S45). The second correction information is thus generated, in which for each of combinations of the four colors (CMYK) with the density values in 256 levels, a second correction value is associated with each of a plurality of positions in the main scanning direction of the corresponding test pattern. The second correction value is based on the difference between the read brightness at the position and the read brightness at the reference position. The creator 102 then stores the thus-generated second correction information in the storage unit 50 (step S46).

Figure 18:
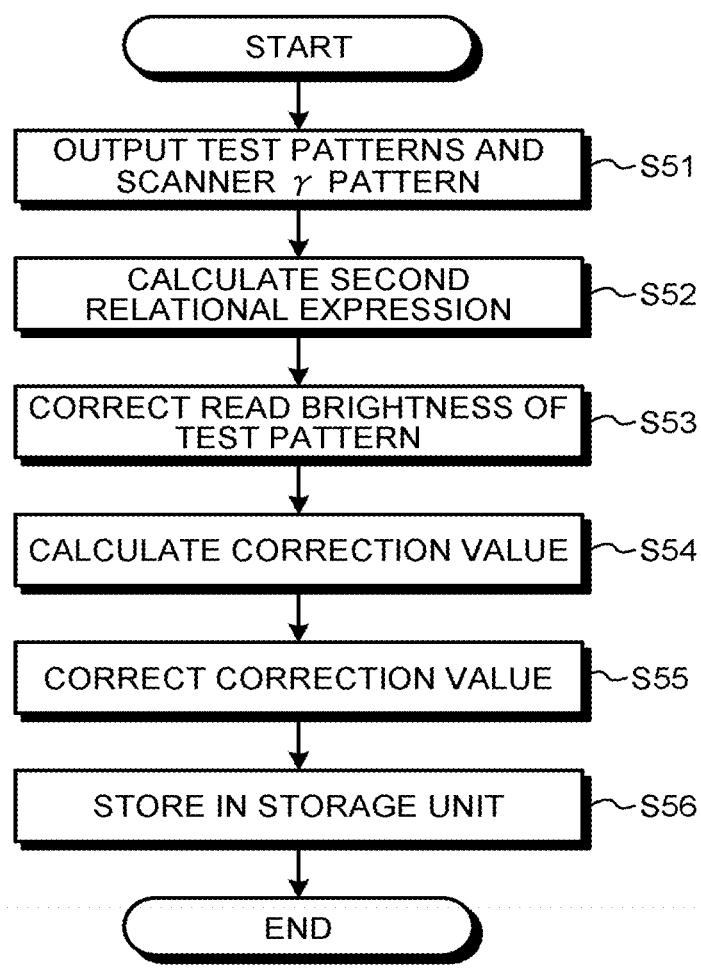
FIG. 18 is a flowchart illustrating an exemplary process of creating correction information.

FIG. 18 is a flowchart illustrating an exemplary process of creating correction information in the calibration processing in the present embodiment. The processing from step S51 to step S54 is the same as the processing from step S1 to step S4 illustrated in FIG. 9, and a detailed description thereof will be omitted. After step S54, the creator 102 corrects the correction value calculated at step S54, using the second correction information (step S55). More specifically, the creator 102 corrects, for each of the four colors (CMYK), the correction value for each of a plurality of positions in the main scanning direction of the density values in 256 levels corresponding to the color (which may be considered as 256 test patterns obtained by interpolation), by adding the correction value calculated at step S54 to the second correction value associated with the position in the second correction information. As described above, the creator 102 creates, for each of the four colors (CMYK), correction information in which a correction value for obtaining a target output value is associated with each of combinations of one of a plurality of density values of image data corresponding to the color and one of a plurality of positions in the main scanning direction of image data, and stores the created correction information in the storage unit 50 (step S56).

FIG. 19 is a diagram illustrating exemplary correction results obtained when calibration in the present embodiment (correction of the correction value using the second correction value) is performed and when not performed. The upper table lists the results before calibration and the lower table lists the results after calibration. As illustrated in FIG. 19, ΔE>1 is found before calibration, whereas after calibration, ΔE≤1 is achieved and there is an obvious improvement.

Here, ΔE is defined as follows: when the measured values of L*a*b* between two points in the CIE1976LAB color space are L*1·b*1·a*1, L*2·a*2·b*2, $\Delta E = \sqrt{((L1^* - L2^*)^2 + (a1^* - a2^*)^2 + (b1^* - b2^*)^2)}$. It is defined that a given color deviation ΔE in main scanning of a calibration plate falls within 1.0. A calibration plate within ΔE≤1.0 is preferably used, because if ΔE≤1, the color difference is an indistinguishable level. In particular, for example, in business cards printed in imposition in one page, such a level as ΔE≤1.0 is required, because a color deviation in a page appears as a color deviation in a business card. The configuration of the present embodiment described above can satisfy this requirement.

Fourth Embodiment

A fourth embodiment will now be described. A description of the configuration in common with the foregoing embodiments will be omitted as appropriate. In the present embodiment, the creator 102 has the function of correcting the read position of the reading unit 30 in the main scanning direction.

Figure 20:
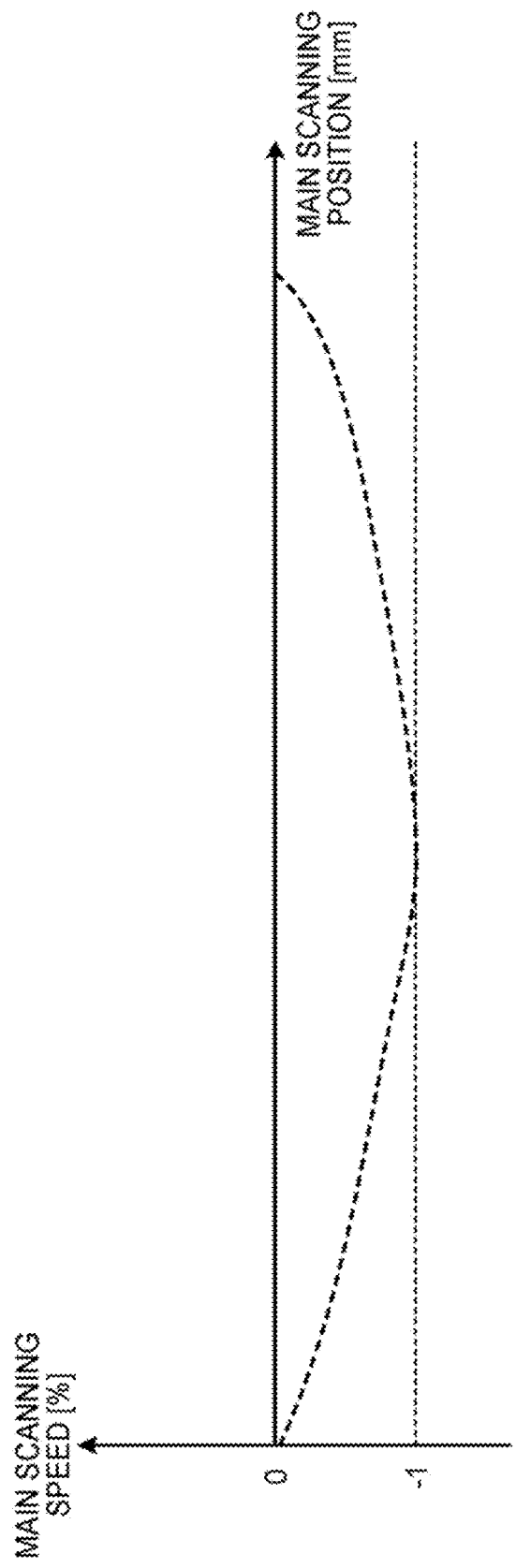
FIG. 20 is a diagram illustrating an exemplary relation between the main scanning position and the scanning speed.

In general, a difference arises between the original image (input image data) and the output image (image obtained by fixing the toner image in accordance with the image data on a recording medium) in the laser writing unit in the image output unit 60 or due to expansion of paper by fixing. In a scan optical system using a laser, an fθ lens is used to scan the image forming position on the photoconductor at constant speed based on the constant angular velocity motion of the polygon mirror, so as to ensure constant speed of scanning. The fθ lens is designed to have a balanced solution between image forming performance and constant-speed scan, so that almost constant-speed scan is performed over the entire main scanning region as illustrated in FIG. 20, but still an error of approximately 1% may remain. Accordingly, the portion scanned fast is shrunken in the output image, while the portion scanned slowly is expanded in the output image. Besides, due to thermal expansion of paper by the fixing unit, the output image tends to be expanded when compared with before fixing.

In view of the circumstances described above, it is necessary to read a magnification error in the main scanning direction and correct the error in order to prevent misalignment between the position of the original in the main scanning direction and the correction position. In the present embodiment, the creator 102 corrects the read position of the reading unit 30 in the main scanning direction, based on the read brightnesses of a plurality of register patterns obtained by forming, on a recording medium, a plurality of register images, spaced apart from each other in the main scanning direction and serving as registration marks. Each of the register images is an image in which a first pattern image extending linearly in the first direction intersects a second pattern image extending linearly in the second direction.

Figure 21:
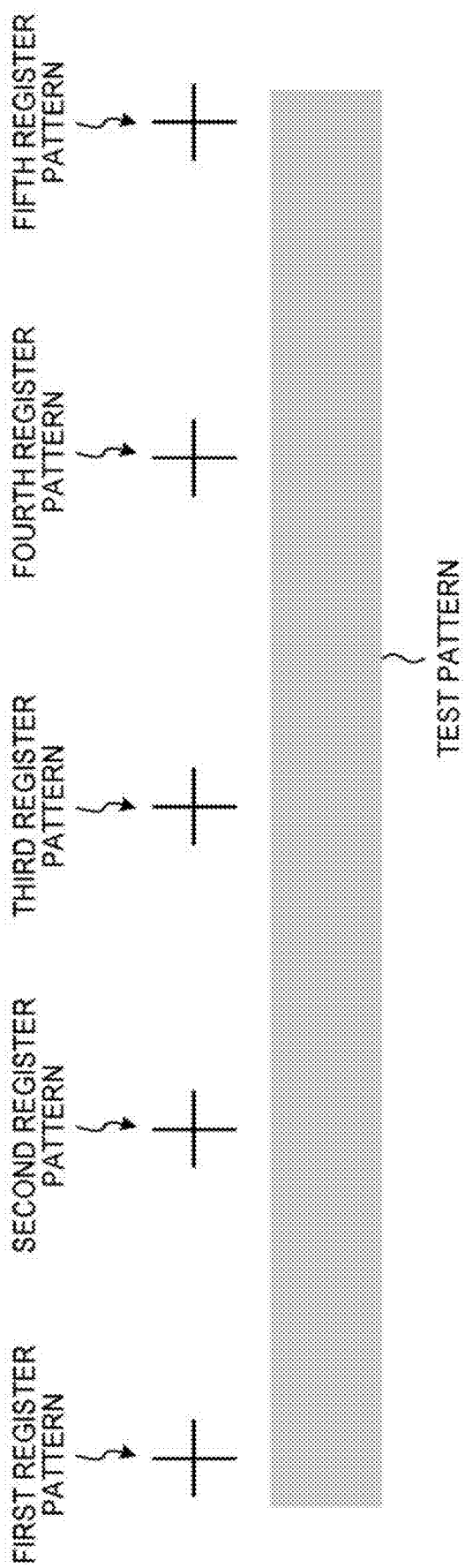
FIG. 21 is a diagram illustrating exemplary register patterns.

FIG. 21 is a diagram illustrating an example of a plurality of register patterns in the present embodiment. Although five register patterns (a first register pattern, a second register pattern, a third register pattern, a fourth register pattern, and a fifth register pattern) are illustrated here, the number of register patterns can be changed as desired. In this example, the register patterns are included in the calibration chart. That is, the creator 102 controls the image output unit 60 such that a plurality of register images having one-to-one correspondence with a plurality of register patterns are formed on a recording medium during execution of the calibration processing.

In the following, the method of correcting the read position in the main scanning direction in a section from the first register pattern to the second register pattern will be described, taking, as an example, the first register pattern located closest to the left end of the recording medium and the second register pattern adjacent to the first register pattern. Similarly, the method is applicable to the other sections.

The creator 102 corrects the read positions in the main scanning direction from the read position corresponding to the intersection of the first register pattern to the read position corresponding to the intersection of the second register pattern, based on the difference between a first distance indicating the distance from the read position corresponding to the intersection of the first register pattern to the read position corresponding to the intersection of the second register pattern and a second distance indicating the distance from the intersection of the first register image corresponding to the first register pattern to the intersection of the second register image corresponding to the second register pattern. In the present embodiment, the creator 102 corrects the read position of the reading unit 30 in the main scanning direction such that the read position corresponding to the intersection of the first register pattern is matched with the position of the intersection of the first register image, and thereafter the creator 102 corrects the read positions in the main scanning direction from the read position corresponding to the intersection of the first register pattern to the read position corresponding to the intersection of the second register pattern, based on the first distance and the second distance.

In the example in FIG. 21, five register images are arranged such that the intersections (center) of the register images are located every 900 dots in 300 dpi (1 dot=1 pixel) in the main scanning direction of the image data of the original (image data for displaying the register images serving as the source of the register patterns), and the coordinates in the main scanning direction of the intersection of the first register image corresponding to the first register pattern are set at the dot 50. The creator 102 corrects the read position of the reading unit 30 in the main scanning direction such that the read position corresponding to the intersection of the first register pattern is matched with the position of the intersection of the first register image (the coordinates in the main scanning direction). For example, when the read position is shifted by five dots to the right, for example, due to misalignment, the creator 102 corrects the read position of the reading unit 30 at the dot 55 in the main scanning direction to the read position at the dot 50.

The creator 102 then corrects the magnification in the main scanning direction by measuring the distance (first distance) from the read position corresponding to the intersection of the first register pattern to the read position corresponding to the intersection of the second register pattern.

For example, suppose a case where the read position corresponding to the intersection of the second register pattern is the dot 952, and the distance (first distance) from the read position corresponding to the intersection of the first register pattern to the read position corresponding to the intersection of the second register pattern is 952−50=902 dots. As described above, the distance (second distance) from the intersection of the first register image corresponding to the first register pattern to the intersection of the second register image corresponding to the second register pattern is 900 dots. In this case, it follows that the read position is shifted by 902/900 from the position of image data of the original (the read position has a larger value). Supposing that the shift is at regular intervals, the magnification is corrected by a factor of 900/902 every one dot the read position advances in the main scanning direction from the read position corresponding to the intersection of the first register pattern to the read position corresponding to the intersection of the second register pattern. For example, when the read position in the main scanning direction is the dot 600, the dot is corrected to 50+(600−50)×(900/902) =598.7. Such magnification correction is performed on the other sections to prevent misalignment in the main scanning direction.

Although embodiments according to the present invention have been described above, the present invention is not intended to be limited to the foregoing embodiments as they are, but the components may be modified and implemented in a practical stage without departing from the spirit of the invention. A variety of inventions can be formed by appropriately combining a plurality of components disclosed in the foregoing embodiments. For example, some of the components illustrated in the embodiments may be deleted from the whole components. Components in different embodiments may be appropriately combined with each other.

The computer program executed in the MFP 1 (the CPU 10) in the foregoing embodiments may be configured so as to be provided as a file in an installable form or an executable form recorded on a computer-readable recording medium such as compact disc-read-only memory (CD-ROM), flexible disk (FD), compact disc-recordable (CD-R), digital versatile disc (DVD), and universal serial bus (USB), or may be provided or distributed via a network such as the Internet. Alternatively, computer programs built in a read-only memory (ROM) may be provided.

An embodiment can correct density values of input image data with a simpler configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image processing apparatus comprising:
circuitry configured to
store, for each of a plurality of colors, correction information in which a correction value for obtaining a target output value is associated with each of combinations of one of a plurality of density values of image data corresponding to the color and one of a plurality of positions in a main scanning direction of image data,
correct, when a pixel in input image data indicating image data received from a host device includes two or more colors, for each of the two or more colors, a density value of the color using a value smaller than a correction value corresponding to a combination of the density value of the color and a position of the pixel in the main scanning direction, and
correct a read position of a scanner reading an image formed on the recording medium, in the main scanning direction, based on brightness readings of a plurality of register patterns formed on the recording medium as a plurality of register images spaced apart from each other in the main scanning direction without any image intervening therebetween and serving as registration marks.

2. The image processing apparatus according to claim 1, wherein the circuitry is further configured to
calculate, for each of the plurality of colors, a first relational expression representing a relation between a correction coefficient and a proportion of the color, based on correspondence information that predefines a correspondence between color information of a patch and the correction coefficient, the patch being obtained by forming, on a recording medium, patch image data in which a density value of a mixed color obtained by mixing two colors including the color is uniformly set for pixels in a predetermined region, the correction coefficient indicating a coefficient by which each of the correction values included in the correction information corresponding to the color is multiplied.

3. The image processing apparatus according to claim 2, wherein the circuitry is further configured to perform control, for each of the plurality of colors, to output the patch of a mixed color including the color and thereafter refer to the correspondence information corresponding to the patch of the mixed color including the color to calculate the first relational expression such that the correction coefficient of the color corresponding to the color information indicating a value obtained by converting read brightness of the already output patch of the mixed color including the color into a L*a*b color system is the correction coefficient when the proportion of the color is 50% and the correction coefficient when the proportion of the color is 100% is one.

4. The image processing apparatus according to claim 2, wherein the correction coefficient is a value equal to or smaller than one and the value of the correction coefficient is smaller as a proportion of a corresponding color is smaller.

5. The image processing apparatus according to claim 2, wherein when a pixel in the input image data includes two or more colors, the circuitry is further configured to
calculate, for each of the two or more colors, the correction coefficient by substituting a proportion of the color included in the pixel into the first relational expression corresponding to the color, and
correct a density value of the color using a value obtained by multiplying the correction value corresponding to a combination of the density value of the color and a position of the pixel in the main scanning direction by the calculated correction coefficient.

6. The image processing apparatus according to claim 1, wherein the circuitry is further configured to
create plural pieces of the correction information having one-to-one correspondence with the plurality of colors, and
create, for each of the plurality of colors, the correction information corresponding to the color, based on brightness readings of a plurality of test patterns obtained by forming, on a recording medium, a plurality of test pattern images each extending in the main scanning direction and having one-to-one correspondence with a plurality of density values of image data corresponding to the color.

7. The image processing apparatus according to claim 6, wherein the circuitry is further configured to
calculate, for each of the plurality of colors, a second relational expression representing a relation between a density value of image data corresponding to the color and a read brightness of an image obtained by forming image data corresponding to the color on the recording medium, from a density value included in a scanner γ image having different density values of the color at plural positions in the main scanning direction and a read brightness of a scanner γ pattern obtained by forming the scanner γ image on the recording medium,
correct a read brightness at each of the plurality of positions in the main scanning direction of the plurality of test patterns corresponding to the color, using the calculated second relational expression, and
calculate the correction value for correcting the corrected read brightness to the target output value.

8. The image processing apparatus according to claim 7, wherein the circuitry is further configured to calculate the second relational expression after correcting a read brightness at each of the plural positions in the main scanning direction of the scanner γ pattern, based on a read brightness at a corresponding position of each of the test patterns.

9. The image processing apparatus according to claim 7, wherein the circuitry is further configured to correct a read brightness at each of the plurality of positions in the main scanning direction of a test pattern corresponding to a particular density value, in accordance with a slope of the second relational expression corresponding to the particular density value.

10. The image processing apparatus according to claim 6, wherein
for each of the plurality of colors, a chart for calibration is prepared in advance in which a plurality of second test patterns are printed, the second test patterns each extending in the main scanning direction and having one-to-one correspondence with a plurality of density values corresponding to the color,
the circuitry is further configured to
generate, for each of the plurality of colors, second correction information in which a second correction value is associated with each of the plurality of positions in the main scanning direction of the second test patterns corresponding to the color, the second correction value being based on a difference between a read brightness at the position and a read brightness at a reference position indicating a position serving as a reference among the plurality of positions, and
correct, for each of the plurality of colors, the correction value for each of the plurality of positions in the main scanning direction of the test patterns corresponding to the color, using the second correction value associated with the position.

11. The image processing apparatus according to claim 10, wherein the circuitry is further configured to calculate, for each of combinations of one of the second test patterns and one of the plurality of positions in the main scanning direction, as a read brightness at the position, a value obtained by averaging brightness readings of the second test pattern over a sub-scanning direction orthogonal to the main scanning direction.

12. The image processing apparatus according to claim 1, wherein each of the register images represents an image in which a first pattern image linearly extending in a first direction intersects a second pattern image linearly extending in a second direction.

13. The image processing apparatus according to claim 12, wherein the circuitry is further configured to correct a read position in the main scanning direction from a read position corresponding to an intersection of a first register pattern to a read position corresponding to an intersection of a second register pattern adjacent to the first register pattern, based on a difference between a first distance indicating a distance from the read position corresponding to the intersection of the first register pattern to the read position corresponding to the intersection of the second register pattern and a second distance indicating a distance from an intersection of a first register image corresponding to the first register pattern to an intersection of a second register image corresponding to the second register pattern.

14. The image processing apparatus according to claim 13, wherein
the first register pattern is located closer to an end of the recording medium than the second register pattern is, and
the circuitry is further configured to correct a read position of the scanner in the main scanning direction such that the read position corresponding to the intersection of the first register pattern is matched with a position of the intersection of the first register image, and thereafter correct a read position in the main scanning direction from the read position corresponding to the intersection of the first register pattern to the read position corresponding to the intersection of the second register pattern, based on the difference between the first distance and the second distance.

15. The image processing apparatus according to claim 1, wherein the circuitry is further configured to
calculate, for each of the plurality of colors, a relational expression representing a relation between a density value of image data corresponding to the color and a read brightness of an image obtained by forming image data corresponding to the color on the recording medium, from a density value included in a scanner γ image having different density values of the color at plural positions in the main scanning direction and a read brightness of a scanner γ pattern obtained by forming the scanner γ image on the recording medium.

16. The image processing apparatus according to claim 1, wherein the plurality of register images are aligned with each other along a line parallel to the main scanning direction.

17. The image processing apparatus according to claim 16, wherein the plurality of register images include crossmark images.

18. An image forming apparatus comprising:
circuitry configured to
store therein, for each of a plurality of colors, correction information in which a correction value for obtaining a target output value is associated with each of combinations of one of a plurality of density values of image data corresponding to the color and one of a plurality of positions in a main scanning direction of image data, correct, when a pixel in input image data indicating image data received from a host device includes two or more colors, for each of the two or more colors, a density value of the color using a value smaller than a correction value corresponding to a combination of the density value of the color and a position of the pixel in the main scanning direction, and correct a read position of a scanner reading an image formed on the recording medium, in the main scanning direction, based on brightness readings of a plurality of register patterns formed on the recording medium as a plurality of register images spaced apart from each other in the main scanning direction without any image intervening therebetween and serving as registration marks.

19. An image processing method comprising:

receiving a pixel in input image data indicating image data received from a host device includes two or more colors;

retrieving, for each of the two or more colors, correction information in which a correction value for obtaining a target output value is associated with each of combinations of one of a plurality of density values of image data corresponding to the color and one of a plurality of positions in a main scanning direction of image data;

correcting a density value of the color using a value smaller than a correction value corresponding to a combination of the density value of the color and a position of the pixel in the main scanning direction; and correcting a read position of a scanner reading an image formed on the recording medium, in the main scanning direction, based on brightness readings of a plurality of register patterns formed on the recording medium as a plurality of register images spaced apart from each other in the main scanning direction without any image intervening therebetween and serving as registration marks.

* * * * *